(12) United States Patent
Inoue et al.

(10) Patent No.: US 9,032,421 B2
(45) Date of Patent: May 12, 2015

(54) COMPUTATION DEVICE AND COMPUTATION EXECUTION METHOD

(75) Inventors: Hiroaki Inoue, Tokyo (JP); Takashi Takenaka, Tokyo (JP)

(73) Assignee: NEC Corporation, Tokyo (JP)

( * ) Notice: Subject to any disclaimer, the term of this patent is extended or adjusted under 35 U.S.C. 154(b) by 23 days.

(21) Appl. No.: 13/985,788

(22) PCT Filed: Oct. 21, 2011

(86) PCT No.: PCT/JP2011/005905
§ 371 (c)(1),
(2), (4) Date: Aug. 15, 2013

(87) PCT Pub. No.: WO2012/114399
PCT Pub. Date: Aug. 30, 2012

(65) Prior Publication Data
US 2014/0208334 A1    Jul. 24, 2014

(30) Foreign Application Priority Data

Feb. 21, 2011  (JP) ................................. 2011-034906
Aug. 24, 2011  (JP) ................................. 2011-182707

(51) Int. Cl.
*G06F 13/00* (2006.01)
*G06F 9/54* (2006.01)
*G06F 7/00* (2006.01)

(52) U.S. Cl.
CPC . *G06F 9/542* (2013.01); *G06F 7/00* (2013.01)

(58) Field of Classification Search
CPC .................................. G06F 8/30; G06F 9/542
USPC ......................................... 719/318; 717/106
See application file for complete search history.

(56) References Cited

U.S. PATENT DOCUMENTS 8,621,425 B1 * 12/2013 Johnson ........................ 717/106

FOREIGN PATENT DOCUMENTS

| JP | 7-262044 A | 10/1995 |
| JP | 2009-93599 A | 4/2009 |
| WO | 2010/107114 A1 | 9/2010 |

OTHER PUBLICATIONS

R. Mueller et al., "Streams on Wires—A Query Compiler for FPGAs", Proceedings of Very Large Data Base Endowment, U.S., Aug. 2009, vol. 2, Issue 1, pp. 229-240.
L. Woods et al., "Complex Event Detection at Wire Speed with FPGAs", Proceedings of Very Large Data Base Endowment, U.S., Sep. 2010, vol. 3, Issue 1-2, pp. 660-669.
Sidhu, R. et al., "First Regular Expression Matching using FPGAs", The 9th Annual IEEE Symposium on Field-Programmable Custom Computing Machines (FCCM'01), 2001. 04, pp. 227-238.

(Continued)

*Primary Examiner* — Andy Ho
(74) *Attorney, Agent, or Firm* — Sughrue Mion, PLLC

(57) ABSTRACT

A computation device includes a data path element (300) including a function processing unit (4000) that executes a computation specified in a function using input data included in an event (1000) as an argument; and a control path element (2000) that detects the event (1000) by use of a return value (ret) of the function. The function processing unit (4000) includes a data calculation unit (4001) that executes a computation and outputs a first result ($d_o$); and a control comparison unit (4002) that outputs, to the control path element (2000), a result of comparison between the input data and data for specifying the event (1000), as the return value (ret).

35 Claims, 37 Drawing Sheets

(56) References Cited

OTHER PUBLICATIONS

Yosuke Kawanaka et al., "A Pattern Independent Regular Expression String Matching Machine and Its FPGA Implementation", The Transactions of the Institute of Electronics, Information and Communication Engineers, Dec. 1, 2009, D vol. J92-D, No. 12, pp. 2159 to 2167.

International Search Report for PCT Application No. PCT/JP2011/005905 mailed on Dec. 13, 2013.

* cited by examiner

| | | |
|---|---|---|
| FUNCTION | = F ( .... ) | # FUNCTION HAVING ARGUMENT EQUAL TO OR GREATER THAN 1 |
| CONCATENATION | = E1 E2 | # E2 IS EXECUTED AFTER E1 |
| SUM | = E1 \| E2 | # E1 OR E2 IS EXECUTED |
| REPETITION | = E+ | # E IS REPEATED ONE OR MORE TIMES |
| GROUPING | = ( E ) | # E IS COLLECTIVELY EXECUTED |
| ELEMENT [E, En] | = FUNCTION OR CONCATENATION OR SUM OR REPETITION OR GROUPING |

Fig. 4

CONCATENATION OF CONTROL PATHS: c1 c2

CONCATENATION OF DATA PATHS: d1 d2

SUM OF CONTROL PATHS: c1 | c2

SUM OF DATA PATHS: d1 | d2

REPETITION OF CONTROL PATH: c+

REPETITION OF DATA PATH: d+

```
RULE = A(sum) B(sum)

EVENT = { ID, temp /* TEMPERATURE */ }

A (sum) = {
        /* ADD TEMPERATURE TO sum */
        sum = EVENT.temp;

/* IF ID IS 100, RETURN 1. IF NOT, RETURN 0 */
        if ( EVENT. ID == 100 ) return 1 else return 0;
}

B (sum) = {
        /* CALCULATE AVERAGE OF TEMPERATURE A() AND TEMPERATURE B() */
        sum = (sum + EVENT.temp ) / 2;

/* IF ID IS 200, RETURN 1. IF NOT, RETURN 0 */
        if ( EVENT.ID == 200 ) return 1 else return 0;
}
```

Fig. 8

```
RULE  = A (yen) | B(yen)
EVENT = { currency, amount }
A (yen) = {
        /* AMOUNT REMAINS ON YEN BASIS */
        yen = EVENT.amount;

/* IF CURRENCY IS YEN, RETURN 1. IF NOT, RETURN 0 */
        if ( EVENT.currency == yen)
                return 1 else return 0;
}

B (yen) = {
        /* CONVERT DOLLAR-BASED AMOUNT TO YEN-BASED AMOUNT */
        yen = EVENT.amount * 80;

/* IF CURRENCY IS DOLLAR, RETURN 1. IF NOT, RETURN 0 */
        if ( EVENT.currency == dollar )
                return 1 else return 0;
}
```

Fig. 14

```
RULE = A (total) + B (total, average)

EVENT = { weather, rainfall_amount }

A (total) = {
        /* INTEGRATE RAINFALL AMOUNTS PER SECOND */
        total += EVENT.rainfall_amount;

/* IF WEATHER IS RAIN, RETURN 1. IF NOT, RETURN 0 */
        if ( EVENT.weather == rain )
                return 1 else return 0;
}

B (total, average) = {
        /* CALCULATE AVERAGE OF INTEGRATED FALL AMOUNTS PER SECOND DURING RAINY WEATHER */
        average = total / get_num_event ();

/* IF WEATHER IS SUNNY, RETURN 1. IF NOT, RETURN 0 */
        if ( EVENT.weather == sunny )
                return 1 else return 0;
}
```

Fig. 21

SUM OF CONTROL PATHS: c1 | c2

SUM OF DATA PATHS: d1 | d2

REPETITION OF CONTROL PATH: c+

REPETITION OF DATA PATH: d+

COMPUTATION DEVICE AND COMPUTATION EXECUTION METHOD

This application is a National Stage Entry of PCT/JP2011/005905 filed Oct. 21, 2011, which claims priority from Japanese Patent Application 2011-034906 filed Feb. 21, 2011, and 2011-182707 filed Aug. 24, 2011, the contents of all of which are incorporated herein by reference, in their entirety.

TECHNICAL FIELD

The present invention relates to a computation device and a computation execution method, which are suitable for processing events, and more particularly, to a computation device and a computation execution method for controlling execution of an event processing function based on regular expressions.

BACKGROUND ART

FIGS. 37A to 37D are figures illustrated in Patent Literature 1, and show a method for configuring hardware to detect, from a given character string, a character string that matches a regular expression. FIGS. 37A to 37D illustrate four configuration patterns for converting basic operators of regular expressions into hardware.

For example, a character string (a|b)*c described by a regular expression represents such a character string that the sum of "a" and "b" (which means that at least one of "a" and "b" is included) is repeated 0 or more times and then "c" follows. Accordingly, for a character string abcdefgh, for example, a character string abc matches the character string described by the regular expression described above.

In the case of converting this regular expression into a circuit, "a", "b", and "c" are first replaced by a character comparison shown in FIG. 37A, i.e., a circuit for detecting whether or not to correspond to each character. Next, a|b connects a sum shown in FIG. 37B, i.e., a circuit for character comparison with "a" and a circuit for character comparison with "b", according to a pattern using a logical OR. Then, (a|b)* connects a repetition shown in FIG. 37D, i.e., a circuit using a|b as a basic unit, according to a predetermined pattern. Lastly, (a|b)*c connects a concatenation shown in FIG. 37C, i.e., connects in series the circuit of (a|b)* shown in FIG. 37D and a circuit using a circuit for character comparison with "c" as a basic unit. As described above, the connection of the character comparison circuits according to the predetermined pattern by using each character comparison circuit as a basic unit makes it possible to systematically convert any regular expression into a circuit.

The character string matching circuit described above is illustrated by way of example. A device that determines whether specific functions are called in a specific order by use of regular expressions is also disclosed in Patent Literature 2, for example.

Further, Non Patent Literature 1 proposes a circuit for detecting an event sequence, which satisfies a specific condition, from a large number of events, by using a specific language different from a function type. Furthermore, Non Patent Literature 2 proposes a circuit for implementing operators of regular expressions that express a repetition.

CITATION LIST

Patent Literature

[Patent Literature 1] Japanese Unexamined Patent Application Publication No. 2009-093599
[Patent Literature 2] Japanese Unexamined Patent Application Publication No. 07-262044

Non Patent Literature

[Non Patent Literature 1] R. Mueller et al., "Streams on Wires—A Query Compiler for FPGAs", Proceedings of Very Large Data Base Endowment, U.S., August, 2009, Vol. 2, Issue 1, pp. 229-240
[Non Patent Literature 2] L. Woods et al., "Complex Event Detection at Wire Speed with FPGAs", Proceedings of Very Large Data Base Endowment, U.S., September, 2010, Vol. 3, Issue 1-2, pp. 660-669

SUMMARY OF INVENTION

Technical Problem

As described later, the term "event" herein described refers not to "an event that has occurred", but to various information generated upon occurrence of an event. This information is not limited to one type. In other words, the term "event" refers to one type of information or a set of a plurality of types of information generated upon occurrence of a certain circumstance. Thus, an event is composed of one type of information or a plurality of types of information. The information constituting the event is referred to as "event information".

When a plurality of events defined as described above is generated in chronological order, the series of events are referred to as "event sequence". Assume herein that an event sequence includes a single event, for convenience of explanation.

For an input event sequence, a predetermined event sequence is detected and predetermined processing is performed according to the detected event sequence in some cases. The processing for an event sequence is referred to as "event processing".

The processing for an event sequence includes detection of an event sequence. Accordingly, it is also possible to apply the character string matching circuit disclosed in Patent Literature 1 to the event processing. However, in the case of applying the technique disclosed in Patent Literature 1 to the event processing, the following problems arise.

The technique disclosed in Patent Literature 1 can deal with detection of each character within a character string by comparing characters, and detection of a character string described by a regular expression. Each character includes only information for identifying each character, for example, information about the type of each character.

On the other hand, as described above, an event is composed of a plurality of pieces of event information in some cases. Accordingly, the technique disclosed in Patent Literature 1 cannot be applied to the detection of an event to be treated in the present invention. This is because when an event is composed of a plurality of types of event information, the technique can deal with only the detection of one type of event information and the detection of a sequence of one type of event information. Therefore, it is impossible to detect a general event and event sequence.

Moreover, in the technique disclosed in Patent Literature 1, only matching of a character string is originally assumed, and any computation corresponding to each character is not assumed. Accordingly, when the technique disclosed in Patent Literature 1 is applied to the processing for an event sequence, it is impossible to perform a computation on data corresponding to a matched event sequence, i.e., event information (e.g., temperature).

Among the above-mentioned conditions, the technique disclosed in Patent Literature 1 cannot satisfy the following two conditions:
1) being able to detect an event sequence; and
2) being able to execute a computation of data associated with the event sequence.

As a result, it is impossible to systematically configure a circuit for event processing.

Further, the technique disclosed in Patent Literature 2 merely detects a function calling order in a software manner. In other words, the technique is only able to detect a function calling order, but is not able to perform a calculation defined corresponding to an event sequence which is matched and expressed by a regular expression.

Furthermore, in the technique disclosed in Non Patent Literature 1, operators of regular expressions that express a repetition are not implemented in a circuit manner, and it is difficult to detect a complex event sequence. Also in a calculation defined corresponding to a matched event sequence, only a preliminarily fixed function can be used.

Moreover, the technique disclosed in Non Patent Literature 2 fails to disclose a technique for performing a calculation defined corresponding to a matched event sequence. This poses a problem that a calculation defined corresponding to an event sequence cannot be performed.

That is, these related art techniques have a problem that it is extremely difficult to achieve both the detection of a complex event sequence and the calculation defined corresponding to a matched event sequence in the event processing.

The present invention has been made to solve the above-mentioned problems, and has an object to provide a computation device and a computation execution method which are capable of detecting an event and performing a calculation defined corresponding to an event sequence.

Solution to Problem

The outline of the present invention that attains the above-mentioned object is described below. A computation device according to the present invention includes: a first data processing means including a first function processing means for executing a first computation specified in a first function using first input data included in a first event as an argument; and a first control processing means for detecting the first event by use of a first return value of the first function. The first function processing means includes: a first data calculation means for executing the first computation and outputting a first result; and a first control comparison means for outputting, to the first control processing means, a result of comparison between the first input data and first data for specifying the first event, as the first return value.

A computation execution method according to the present invention includes: executing a first computation to output a first result, and outputting, as a first return value, a result of comparison between first input data included in a first event and first data for specifying the first event, thereby executing the first computation specified in a first function using the first input data as an argument; and detecting the first event by use of the first return value of the first function.

A non-transitory computer readable medium according to the present invention stores a program for causing a computer to execute: a first data processing for executing a first computation to output a first result, and outputting, as a first return value, a result of comparison between first input data included in a first event and first data for specifying the first event, thereby executing the first computation specified in a first function using the first input data as an argument; and a first control processing for detecting the first event by use of the first return value of the first function.

Advantageous Effects of Invention

According to the present invention, it is possible to provide a computation device, a computation execution method, and a non-transitory computer readable medium storing a program, which are capable of detecting an event or an event sequence and achieving a calculation defined corresponding to the detected event or event sequence.

BRIEF DESCRIPTION OF DRAWINGS

FIG. 4 is a diagram for explaining operators according to a second exemplary embodiment of the present invention;

FIG. 8 is a diagram showing an example of a concatenation of regular expressions in a third exemplary embodiment of the present invention;

FIG. 14 is a diagram showing an example of a sum of regular expressions in a fourth exemplary embodiment of the present invention;

FIG. 21 is a diagram showing an example of a repetition in a regular expression in a fifth exemplary embodiment of the present invention;

DESCRIPTION OF EMBODIMENTS

Figure 1:
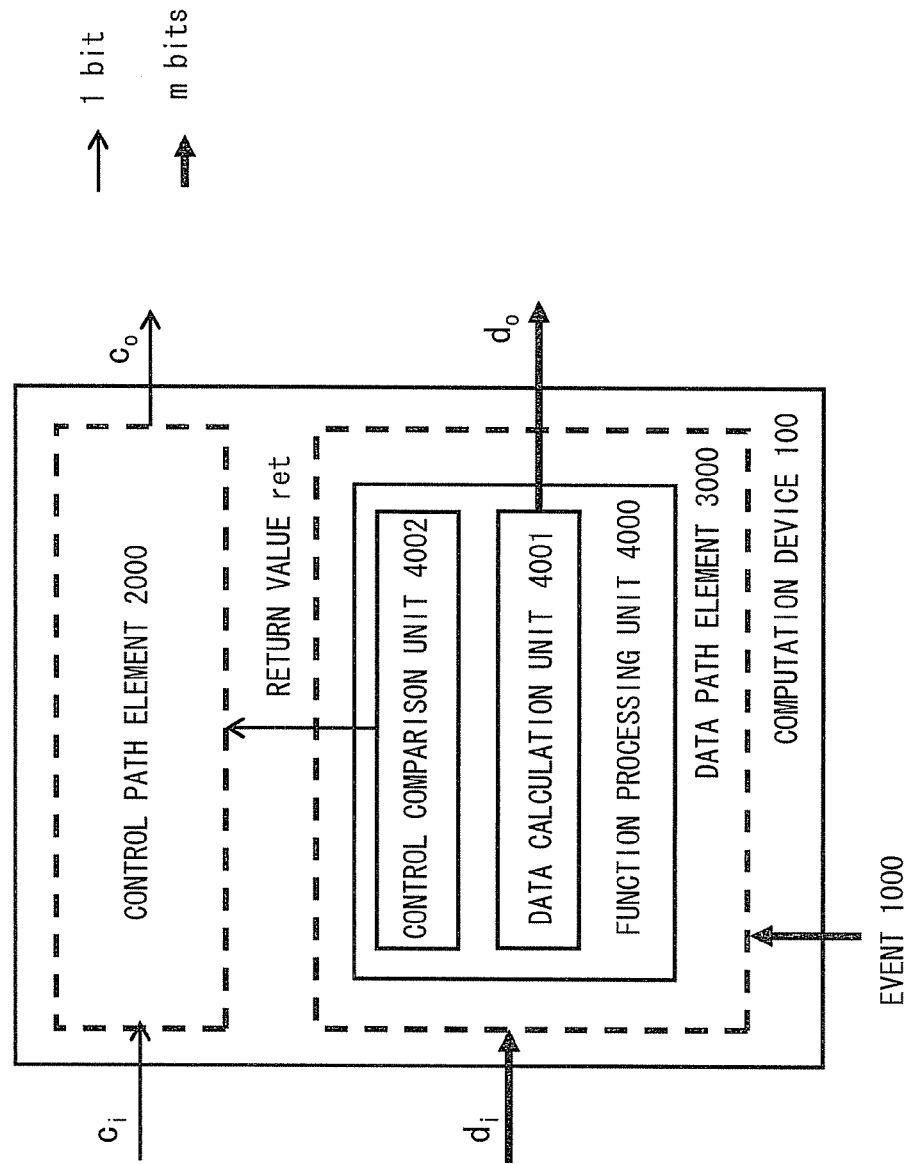
FIG. 1 is a diagram showing a computation device according to a first exemplary embodiment of the present invention.

Hereinafter, exemplary embodiments of the present invention will be described in detail with reference to the drawings. In these exemplary embodiments, the present invention implements "computation of regular expressions using a function as an element", and is applied to a computation device, a computation execution method, and a program which are capable of achieving detection of a complex event and calculation defined corresponding to a matched event sequence.

Now, "computation of regular expressions using a function as an element" will be described. The computation device according to this exemplary embodiment performs a predetermined process defined for each function on an input event. The predetermined process includes detection as to whether the event matches a predetermined condition, and a predetermined computation using the event. The term "event" herein described refers to "various information generated upon occurrence of a certain event, or a pair of pieces of information" as described above. The predetermined detection is, for example, detection as to whether information included in an event (hereinafter referred to as "event information") matches certain information. The predetermined computation is, for example, a computation using the event information.

In the case of inputting a plurality of events in chronological order, i.e., in the case of inputting an event sequence, continuous processes to be performed on each event constituting the event sequence can be defined. Specifically, "a function sequence", which indicates continuous functions, can be defined. As the function sequence, continuation or repetition of different processes, or execution of only one of the processes, for example, can be defined. Accordingly, the function sequence can also be represented by regular expressions, as in the case of a character string.

In this manner, "computation of regular expressions using a function as an element" is an expression of an execution order of computations to be continuously executed, execution conditions, and the like defined with functions, by use of regular expressions.

In exemplary embodiments of the present invention, automatic synthesis of computation devices can be performed using CAD (Computer Aided Design) or the like by employment of a systematic configuration method described below. Further, unlike an approach using a particular language as in the related art, user-friendly interfaces, such as a procedure-oriented language and a regular expression, are provided, which is suitable for development of various applications.

(1) First Exemplary Embodiment of the Present Invention

A computation device according to this exemplary embodiment receives a data group (event) including one or more pieces of data (hereinafter referred to as "input data"), and executes a predetermined computation. Specifically, the computation device receives an event, executes a computation specified in each function using the input data as an argument, and outputs a result. Further, the computation device outputs a comparison result of the input data as a return value, and executes a process for detecting an event by use of the return value of the function.

FIG. 1 is a diagram showing the computation device according to this exemplary embodiment. As shown in FIG. 1, a computation device 100 includes a data path element 3000 serving as data processing means, and a control path element 2000 serving as control processing means. The data path element 3000 includes a function processing unit 4000 that executes a computation specified in each function using event information, which configures an event 1000, as an argument. The control path element 2000 detects an event including one or more pieces of event information, by use of a return value ret of the function.

In this case, the function processing unit 4000 includes a data calculation unit 4001 that executes a computation and outputs a result $d_O$, and a control comparison unit 4002 that outputs, to the control path element 2000, a result of comparison with the event information or first data, as the return data ret. The computation device according to this exemplary embodiment will be described below in more detail.

Figure 2:
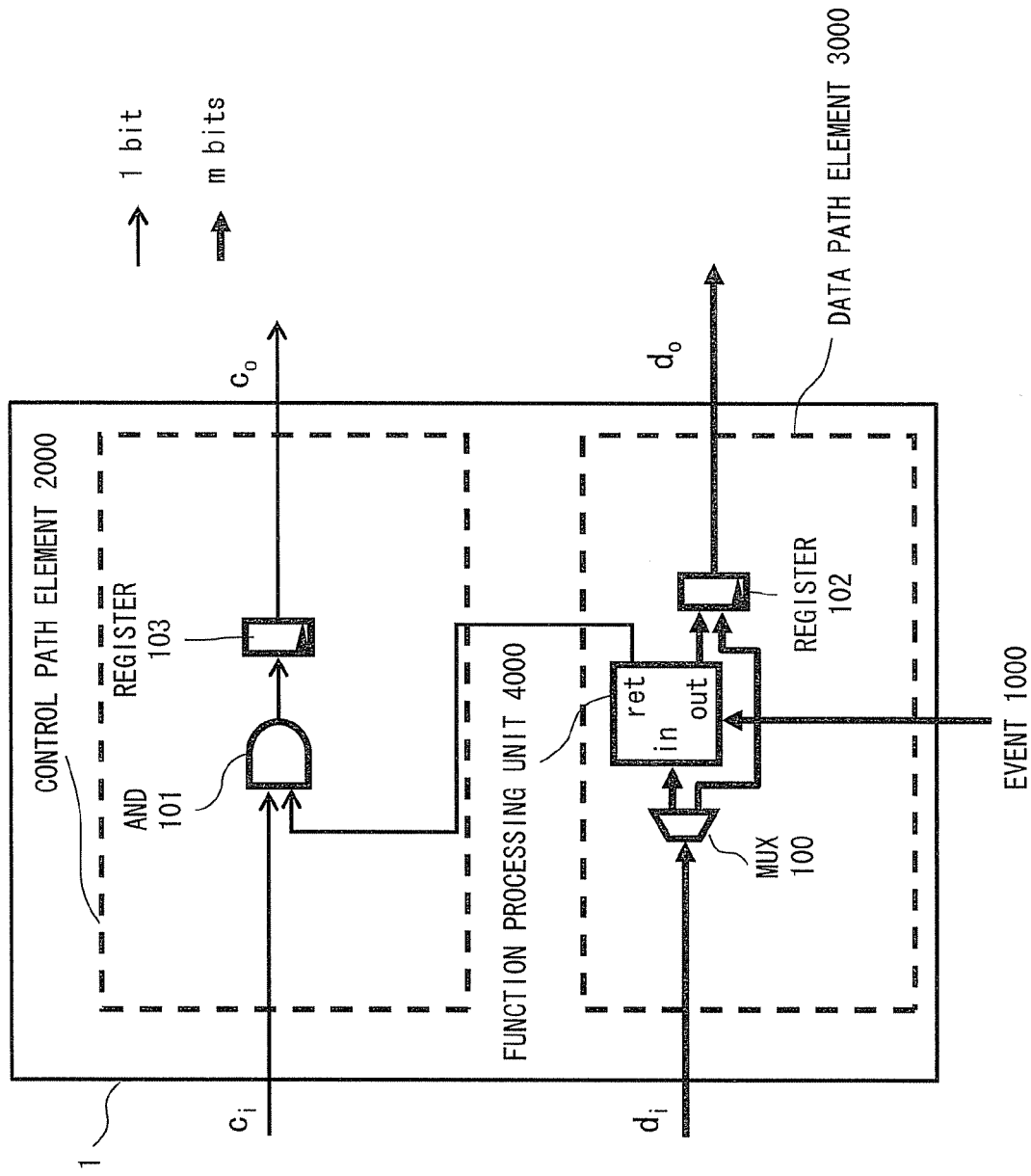
FIG. 2 is a diagram showing a computation device that executes a function computation according to the first exemplary embodiment of the present invention.

FIG. 2 is a diagram showing a computation device according to this exemplary embodiment which is a specific example of the computation device shown in FIG. 1. As shown in FIG. 2, the computation device receives the event 1000 having one or more pieces of input data. The input data herein described corresponds to the above-mentioned event information. This computation device 1 includes the data element 3000 serving as the data processing means including the function processing unit 4000 which executes a function arithmetic processing, and the control path element 2000 serving as the control processing means for detecting an event by use of the return value ret of the function.

The function processing unit 4000 includes a data calculation unit (described later) that executes a computation specified in each function using the input data as an argument and outputs a computation result, and a control comparison unit (described later) that outputs, to the control path element 2000, a result of comparison with the input data as the return value. The data calculation unit stores, compares, or computes and outputs the input data.

The function processing unit 4000 is configured to execute a computation defined for each function designated by a user. The function processing unit 4000 receives the event 1000 and an input argument in, and outputs the return value ret and an output argument out. The input in herein described refers to a value obtained by selecting a part of a computation result $d_i$ of a preceding stage by a MUX 100, for example. An unnecessary portion of the computation result $d_i$ is not input to the function processing unit 4000, but is output as the output $d_O$ together with the computation result out of the function processing unit 4000 through a register 102.

The control path element 2000 includes a circuit AND 101 that takes a logical AND of the return value ret of the function processing unit 4000 and a truth value of a preceding element, and a register 103 that stores the result of the AND 101. The data path element 3000 includes the function processing unit 4000 as well as the multiplexer MUX 100 that supplies arguments necessary for the function processing unit 4000 in the preceding calculation result and bypasses unnecessary arguments, and the register 102 that stores the output result of the function processing unit 4000 and the bypassed data.

The return value ret of the function herein described refers to a truth value indicative of whether the input data included in the event matches predetermined data for specifying the event as a result of checking the input event 1000, specifically, a truth value indicative of whether a specific event has occurred or not. For each of the arguments, the result of the predetermined computation using the event information included in the event 1000 is referred to or stored.

Figure 3:
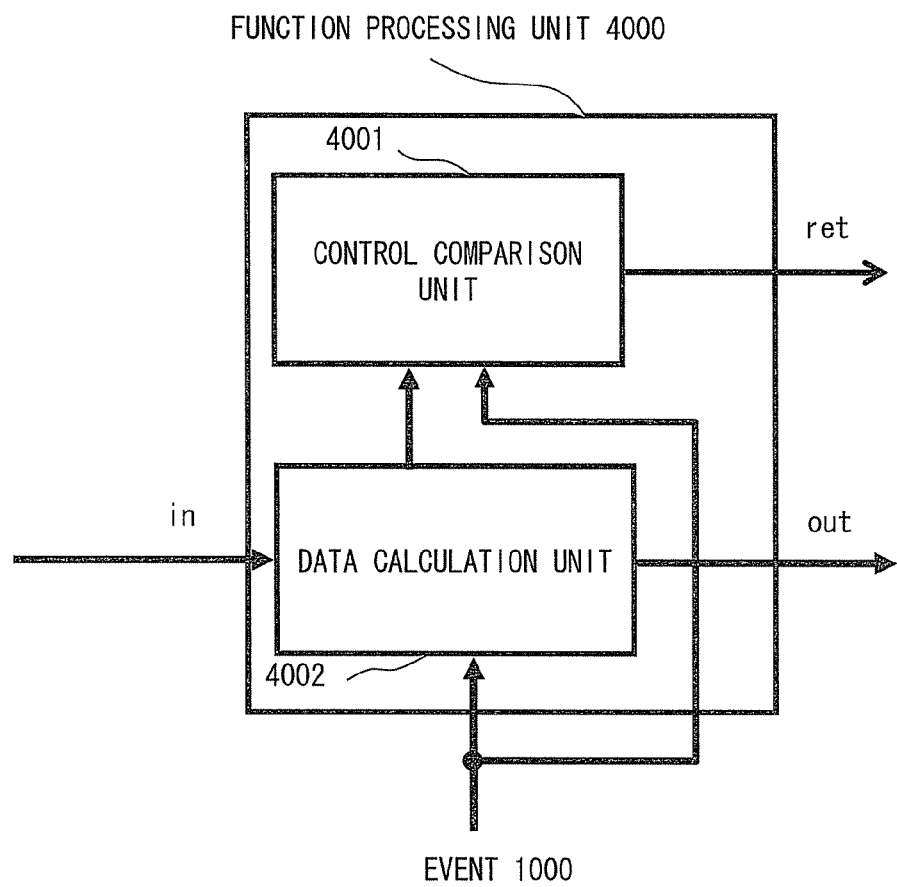
FIG. 3 is a diagram showing details of a function processing unit 4000 according to the first exemplary embodiment of the present invention.

FIG. 3 is a diagram showing details of the function processing unit 4000 according to this exemplary embodiment. As shown in FIG. 3, the function processing unit 4000 includes a control comparison unit 4001 and a data calculation unit 4002. Upon receiving the event 1000 and the result of the computation executed in the data calculation unit 4002 or the calculated value obtained during the computation, the control comparison unit 4001 outputs the return value ret indicative of whether the event has occurred or not. On the other hand, the data calculation unit 4002 has the preceding calculation result as the argument in, executes the predetermined computation specified in each function based on the event 1000, and outputs the computation result as the argument out. Note that the control comparison unit 4001 may receive at least the event 1000. Depending on the computation specified in each function, the data calculation unit 4002 may use only the event 1000 as an argument.

The content of the computation specified in each function is not particularly limited. For example, the computation may be comparison with a predetermined character or character string. Alternatively, the computation may execute no processing. Specifically, the computation may include storing the preceding calculation result as the argument in, or merely storing the input data, and directly outputting the input data as the argument out.

For example, when the control comparison unit 4001 of the function processing unit 4000 detects the event, "1" is output as the return value ret. At this time, when a signal $c_i$ to be input to the control path element 2000 is set to "1", "1" indicating the detection of the event can be output as an event detection result signal $c_0$ upon occurrence of the event. At the same time, the data calculation unit 4002 can execute a computation on the event and output the result signal $d_0$ through the output out, thereby obtaining the computation result upon detection of the event.

The regular expressions for the above-mentioned character string include no arguments contributing to the calculation. Accordingly, the matching processing for the character string can be considered as a function for simply performing a comparison inside to check whether the characters are given and returning a return value.

On the other hand, in this exemplary embodiment, at least one function processed in the function processing unit 4000 is defined as a function including an argument. For this reason, in this exemplary embodiment, not only the detection of an event sequence (including a single event) but also the definition of a computation to be executed on each event can be achieved.

Consequently, a computation device capable of detecting a complex event sequence and executing a predetermined computation on each event as needed can be configured using a combination of the computation devices. The details thereof will be described in the following exemplary embodiments.

(2) Second Exemplary Embodiment of the Present Invention

Next, a second exemplary embodiment of the present invention will be described. This exemplary embodiment illustrates a computation device that receives an event sequence composed of events, and executes a computation of regular expressions including one or more functions and operators.

FIG. 4 is a diagram for explaining operators according to this exemplary embodiment. As shown in FIG. 4, examples of the operators include a concatenation to describe execution of a computation for the next function subsequent to one function; a sum to describe selection of a result of a computation for one of two functions; and a repetition to describe continuous execution of one or more times of computation for each function.

The term "grouping" herein described refers to a notation provided for the sake of convenience in order to solve the ambiguity of each of functions and operators. Specifically, when a function sequence of e1e2|e3e4 is written, the grouping is used to discriminate whether the sum of e2 and e3 is present as the concatenation of e1 and e4 is present as the concatenation thereof, or to discriminate whether the function sequence indicates the sum of the concatenation of e1 and e2 and the concatenation of e3 and e4. When the function sequence indicates the former, the function sequence is described as e1(e2|e3)e4. When the function sequence indicates the latter, the function sequence is described as (e1e2)|(e3,e4). That is, the grouping is a notation necessary for interpreting the meaning of a function sequence, and is not substantially mapped into a specific circuit element.

In this exemplary embodiment, the function sequence is represented by regular expressions. Each of the functions constituting the function sequence receives an event. In other words, at least one of the functions of the function sequence represented by regular expressions includes one or more arguments. A part or the whole of the input data included in the event serves as the argument of the function. When the function refers to one or more computation results in the preceding-stage computation device, these computation results also serve as arguments. Then, the function outputs a truth value indicative of whether specific input data is detected or not as a return value.

In the computation device according to this exemplary embodiment, events including a plurality of pieces of input data are input as an event sequence. For example, the computation device detects a specific event sequence from the received event sequence and outputs the computation result obtained at that time. As described above, the term "event" herein described refers to an event including data (event information) generated in association with a certain event. As a specific example of the event, the event information includes the name of a patient, the name of a medicine, an amount of a medicine, when to take a medicine, and a body temperature, for example. In this case, the computation device detects a case where a certain patient A takes medicines B1, B2, and B3 in this order, as an event sequence to be detected. Further, the computation device can output an average body temperature, for example, as a result of a computation defined in a function sequence including functions to be executed on the respective events.

An event sequence includes a sequence of event information, i.e., successive pieces of information. Accordingly, specific examples of the event sequence include real-time information input from a sensor, a terminal, and the like. Though this exemplary embodiment is described assuming that an event includes a plurality of pieces of event information (input data), an event may include a single piece of input data.

In the case of detecting an event sequence and executing computations corresponding to the respective events as described above, a number of computation devices 1 described in the first exemplary embodiment corresponding to the number of detected events may be provided. Further, in the case of configuring a computation device by use of a plurality of computation devices, as long as the computation devices include at least one computation device 1 described in the first exemplary embodiment, the other computation devices may have different configurations.

Next, a description is made of the case where the computation device according to this exemplary embodiment is configured using one or two computation devices according to the first exemplary embodiment described above.

(2-1) Concatenation of Functions

Figure 5A:
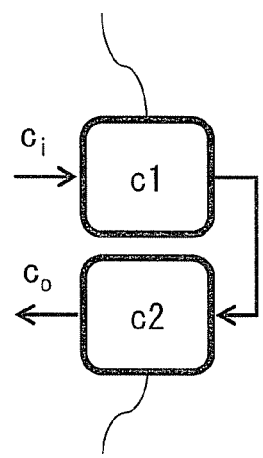
FIG. 5A is a diagram showing a concatenation of regular expressions for a computation device according to a second exemplary embodiment of the present invention to execute a computation.
Figure 5B:
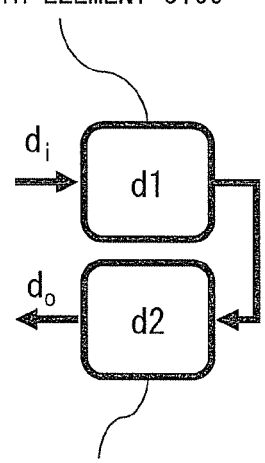
FIG. 5B is a diagram showing a concatenation of regular expressions for the computation device according to the second exemplary embodiment of the present invention to execute a computation.

Each of FIGS. 5A and 5B shows a concatenation of regular expressions in the computation executed by the computation device according to this exemplary embodiment. The computation device of this exemplary embodiment may be configured using two computation devices according to the first exemplary embodiment. Alternatively, the computation device according to this exemplary embodiment may be composed of two computation devices including control path elements and data path elements, and at least one of the computation devices may be the computation device according to the first exemplary embodiment.

FIGS. 5A and 5B show methods for connecting control paths and data paths. FIG. 5A shows a method for connecting control paths. As for the control paths, a control path element 2100 and a control path element 2101 are connected in series. FIG. 5B shows a method for connecting data paths. As for the data path elements, a data path element 3100 and a data path element 3101 are connected in series. Note that the control path elements and the data path elements may be configured using not only functions but also a function sequence in accordance with the rules of the regular expressions shown in FIG. 4. In this manner, the data path element 3101 outputs the arithmetic processing result based on the arithmetic processing result of the data path element 3100, and the control path element 2101 outputs the detection result based on the result of the control path element 2100.

(2-2) Sum of Functions

Figure 6A:
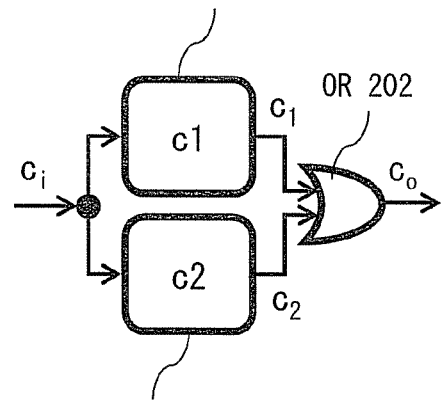
FIG. 6A is a diagram showing a sum of regular expressions for the computation device according to the second exemplary embodiment of the present invention to execute a computation.
Figure 6B:
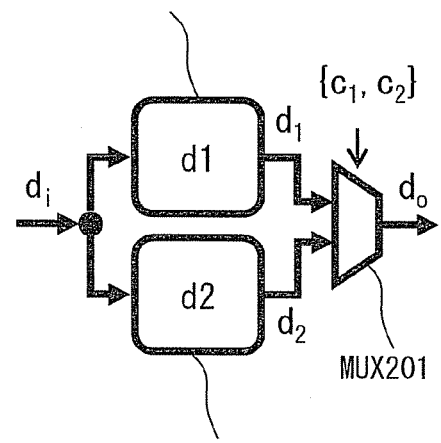
FIG. 6B is a diagram showing a sum of regular expressions for the computation device according to the second exemplary embodiment of the present invention to execute a computation.

Each of FIGS. 6A and 6B shows a sum of regular expressions in the computation executed by the computation device according to this exemplary embodiment. The computation device according to this exemplary embodiment may also be configured using two computation devices according to the first exemplary embodiment. Alternatively, the computation device according to this exemplary embodiment may be composed of two computation devices including control path elements and data path elements, and at least one of the computation devices may be the computation device according to the first exemplary embodiment.

FIGS. 6A and 6B show methods for connecting control paths and data paths. FIG. 6A shows a method for connecting control paths. As for the control paths, the output result c, of the preceding control path is input to the control path element 2200 and the control path element 2201 in parallel. Furthermore, outputs $c_1$ and $c_2$ of the control path element 2200 and the control path element 2201 are connected to a logical OR (OR) 202. An output $c_0$ of the OR 202 indicates the event detection result. In other words, the OR 202 functions as determination means for determining that an event sequence is detected, when at least one of the control path element 2200 and the control path element 2201 detects an event.

FIG. 6B shows a method for connecting data paths. As for the data path elements, the output result $d_i$ of the preceding data path is input to a data path element 3200 and a data path element 3201 in parallel. A result $d_1$ of the data path element 3200 and a result $d_2$ of the data path element 3201 are connected to a multiplexer MUX 201. The multiplexer MUX 201 outputs the result $d_1$ of the data path element 3200 when the output result $c_1$ of a control path 2200 indicates 1, and outputs the result $d_2$ of the data path element 3201 when the output result $c_2$ of a control path 2201 indicates 1. That is, the output result $d_0$ of the multiplexer MUX 201 becomes the computation result of the computation corresponding to the event sequence.

When the results $c_1$ and $c_2$ of both the control paths indicate 1, the result of one of the data path elements $d_1$ and $d_2$ is output. When the results $c_1$ and $c_2$ of both the control paths indicate 0, the result of one of the data path elements $d_1$ and $d_2$ may be output, or any value may be output. In other words, the multiplexer MUX 201 functions as a first selection means for selecting and outputting one of the computation results $d_1$ and $d_2$ of the data path element 3200 and the data path element 3201 according to the output results $c_1$ and $c_2$ of the control path element 2100 and the control path element 2101.

Note that the control path elements and the data path elements may be configured using not only functions but also a function sequence in accordance with the rules of the regular expressions shown in FIG. 4.

(2-3) Repetition of Functions

Figure 7A:
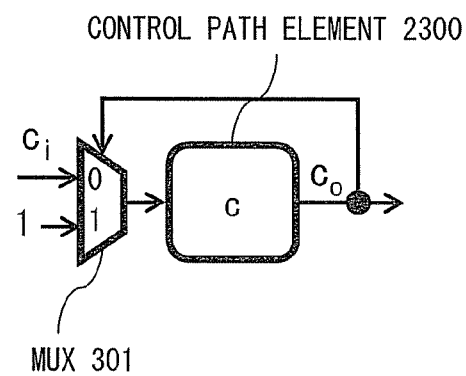
FIG. 7A is a diagram showing a repetition in a regular expression for the computation device according to the second exemplary embodiment of the present invention to execute a computation.
Figure 7B:
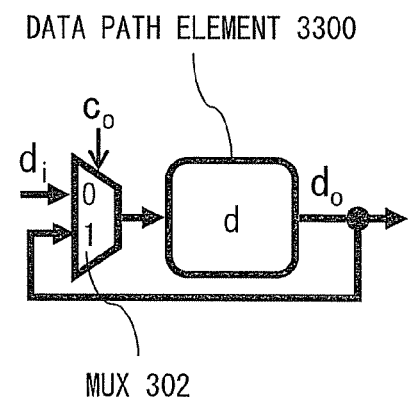
FIG. 7B is a diagram showing a repetition in a regular expression for the computation device according to the second exemplary embodiment of the present invention to execute a computation.

Each of FIGS. 7A and 7B shows a repetition in a regular expression in the computation executed by the computation device according to this exemplary embodiment. The computation device of this example may include, as a component, one computation device according to the first exemplary embodiment.

FIG. 7A and FIG. 7B show methods for connecting control paths and data paths. FIG. 7A shows a method for connecting a control path. As for the control path, a multiplexer MUX 301 that outputs the result $c_i$ of the preceding control path or 1 to a control path element 2300 is provided. The multiplexer MUX 301 outputs the result $c_i$ of the preceding control path to the control path element 2300 when the output result $c_0$ of the control path element 2300 indicates 0, and outputs 1 to the control path element 2300 when the output result $c_0$ of the control path element 2300 indicates 1. In other words, the multiplexer MUX 301 functions as a second determination means for determining whether or not to output the output $c_i$ of the preceding-stage control path element to the control path element 2300 according to the output result $c_0$ of the control path element 2300.

FIG. 7B shows a method for connecting a data path. As for the data path element, a multiplexer MUX 302 that outputs the result $d_i$ of the preceding data path element or the output result $d_0$ of a data path element 3300 to the data path element 3300. The multiplexer MUX 302 outputs the result $d_i$ of the preceding data path element to the data path element 3300 when the output result $c_0$ of the control path element 2300 is 0, and outputs the output result $d_0$ of the data path element 3300 to the data path element 3300 when the output result $c_0$ of the control path element 2300 is 1. In other words, the multiplexer MUX 302 functions as a third determination means for selecting one of the output results $d_0$ and $d_i$ of the data path element 3300 and the preceding-stage data path element according to the output result $c_0$ of the control path element 2300 and outputting the selected output result to the data path element 3300.

Note that in the examples shown in FIGS. 2, 6, and 7 described above, a multiplexer, a register, a logical AND, a logical OR, and the like are described as components. However, any circuit configuration may be used as long as the configuration implements the same logic operations.

Incidentally, new services for processing real-time information (event sequence) obtained from sensors or terminals have been recently provided. Herein, an event can also be represented using a structure composed of a plurality of pieces of event information (data). When a large number of events have occurred, it is important to replace the event processing by hardware, such as a typical CPU (Central Processing Unit) as well as ASIC (Application Specific Integrated Circuit) and FPGA (Field-Programmable Gate Array), in order to process the events in so-called real time. To implement the above-mentioned event processing, it is important to satisfy the following two conditions:

1) detecting the order of occurrence of events (for example, an event B occurs after an event A, and finally an event C occurs); and 2) enabling a defined calculation on each event matching a predetermined condition (for example, calculating an average of a temperature received in the event A and a temperature received in the event B).

As described above, it has been difficult to implement the above-mentioned two processes by hardware. On the other hand, in this exemplary embodiment, the computation device includes the function processing unit that executes a computation associated with a function using input data included in an event as an argument and outputs a result, and also outputs the comparison result of the input data as a return value. This enables detection of an event sequence by use of the return value, and allows the defined computation corresponding to the event to be executed by the function processing unit. Accordingly, the processing for an event sequence is executed by the computation device configured by hardware, thereby making it possible to process the event sequence at high speed.

Note that the present invention can also be configured by software. The details thereof will be described later. The implementation using software eliminates the need for providing a circuit exclusively used for event processing to the computation device. Accordingly, the circuit size of the computation device can be reduced.

(3) Third Exemplary Embodiment of the Present Invention

Next, a third exemplary embodiment of the present invention will be described. A computation device according to this exemplary embodiment has a configuration in which two computation devices according to the first exemplary embodiment are connected using the concatenation according to the second exemplary embodiment described above.

First, the functions to be computed by the computation device according to this exemplary embodiment will be described. FIG. 8 shows an example of a concatenation of regular expressions in the third exemplary embodiment of the present invention. As shown in FIG. 8, the regular expressions are described as a concatenation of functions A and B each having an argument sum (see the line "RULE"). In other words, the function A and the function B constitute a function sequence represented by regular expressions. An event is composed of event information including an ID of a sensor and a temperature temp measured by the sensor.

In this case, the function A outputs the temperature included in the event information to the argument sum. Further, when the ID of the sensor in the input event is 1, the function A returns 1, and when the ID is not 1, the function A returns 0. On the other hand, the function B calculates the sum of the value of the argument sum of the function A and the temperature of the input event, and divides the sum by 2, thereby calculating the average value between the temperatures of two events. Then, when the ID of the input event is 200, the function B returns 1, and when the ID is not 1, the function B returns 0.

Figure 9:
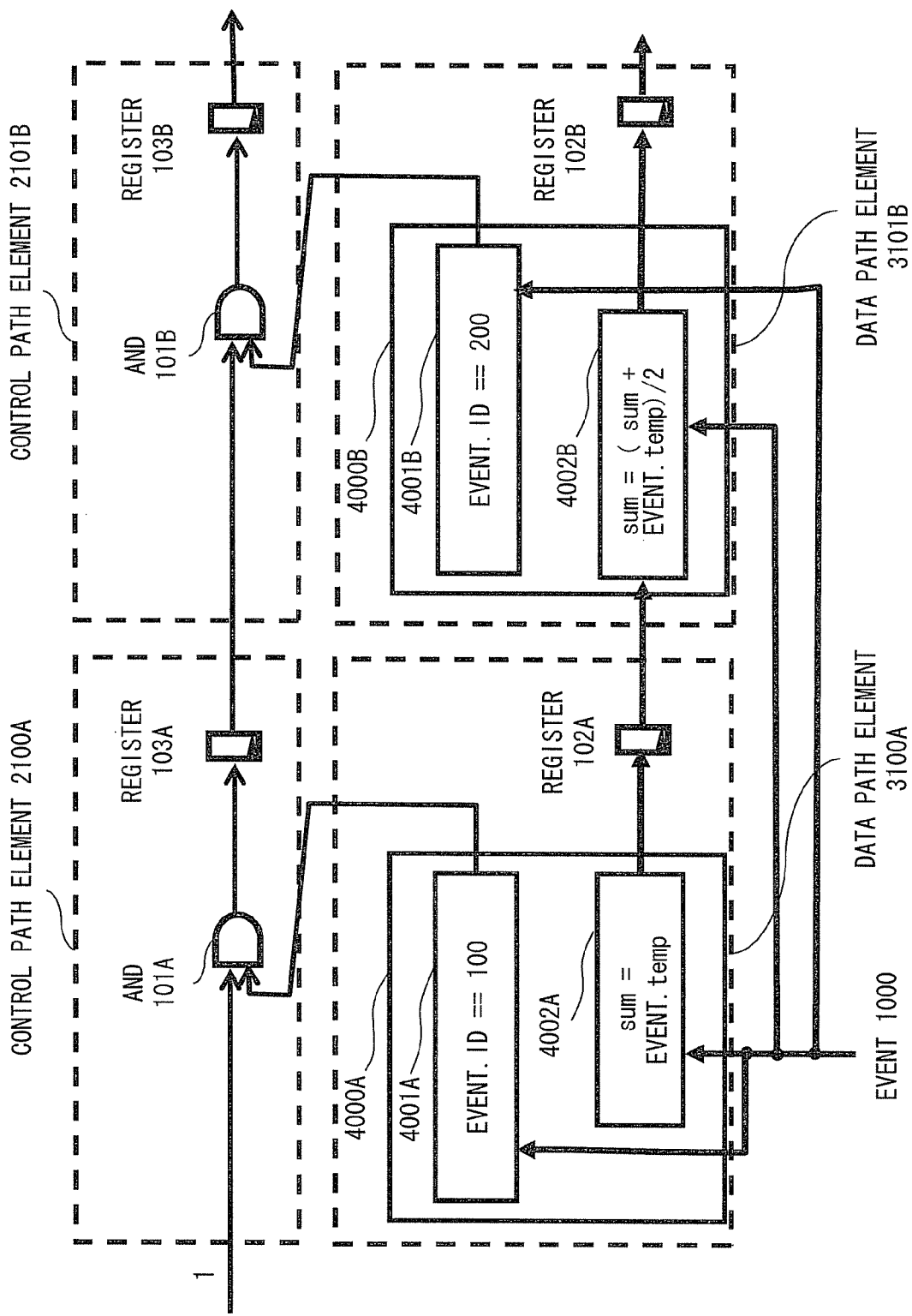
FIG. 9 is a diagram showing a computation device according to the third exemplary embodiment of the present invention which performs arithmetic processing on the concatenation of regular expressions shown in FIG. 8.

FIG. 9 is a diagram showing the computation device according to this exemplary embodiment which performs arithmetic processing on the concatenation of regular expressions shown in FIG. 8. As shown in FIG. 9, in accordance with the rules shown in FIGS. 2, 3, and 5, the computation device according to this exemplary embodiment includes control path elements 2100A and 2101B and data path elements 3100A and 3101B. The data path element 3100A includes a function processing unit 4000A and a register 102A. The data path element 3101B includes a function processing unit 4000B and a register 102B. The control path element 2100A includes a logical AND (AND) 101A and a register 103A. The control path element 2101B includes an AND 101B and a register 103B. The function processing unit 4000A includes a control comparison unit 4001A and a data calculation unit 4002A. The function 4000B includes a control comparison unit 4001B and a data calculation unit 4002B.

In accordance with the rules shown in FIGS. 2, 3, and 5, the control path elements 2100A and 2101B are connected as a concatenation, and the data path elements 3100A and 3101B are connected as a concatenation.

In this case, the control comparison unit 4001A of the function processing unit 4000A determines whether the ID of the input event matches 100, and outputs the return value ret. The data calculation unit 4002A stores the temperature temp of the input event into the output argument sum. On the other hand, the control comparison unit 4001B of the function processing unit 4000B determines whether the ID of the input event matches 200, and outputs the return value ret. The data calculation unit 4002B calculates an average of the temperature temp of the input event and the temperature of the function A, specifically, the value stored in the register 102A of the data path element 3100A. Note that in this example, the input of the control path element 2100A is fixed at 1, because there is no preceding result. The data path element 3100A is supplied with no value, because the data path element 3100A requires no input from the preceding stage.

(3-1) Operation 1 (Event 1000_1 {ID=100, Temp=50})

Figure 10:
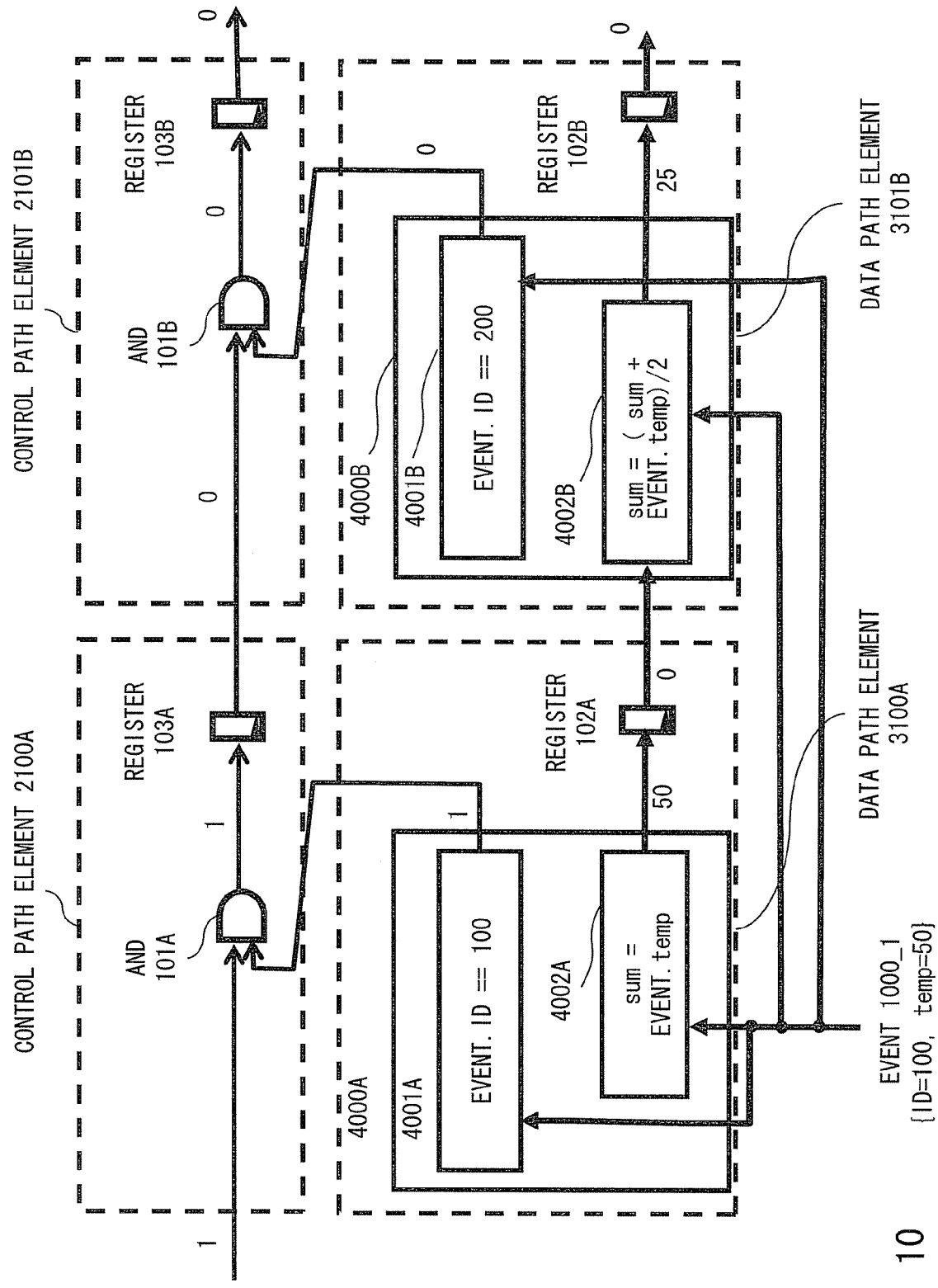
FIG. 10 is a diagram showing an exemplary operation of the computation device according to the third exemplary embodiment of the present invention which executes a computation of the concatenation of regular expressions shown in FIG. 9.

Next, a method for processing an event sequence of the computation device according to this exemplary embodiment will be described. FIG. 10 is a diagram showing an exemplary operation of the computation device according to this exemplary embodiment which executes a computation of the concatenation of regular expressions shown in FIG. 9. FIG. 10 shows an example in which an event 1000_1 having an ID of 100 and a temperature of 50 is supplied as an input to each of the function processing units 4000A and 4000B. As a result, the output result of the control comparison unit 4001A indicates 1; the output result of the data calculation unit 4002A indicates 50; the output result of the AND 101A indicates 1; the output result of the control comparison unit 4001B indicates 0; the output result of the AND 101B indicates 0; and the output result of the data calculation unit 4002B indicates 25.

(3-2) Operation 2 (Event 1000_2 {ID=200, Temp=150})

Figure 11:
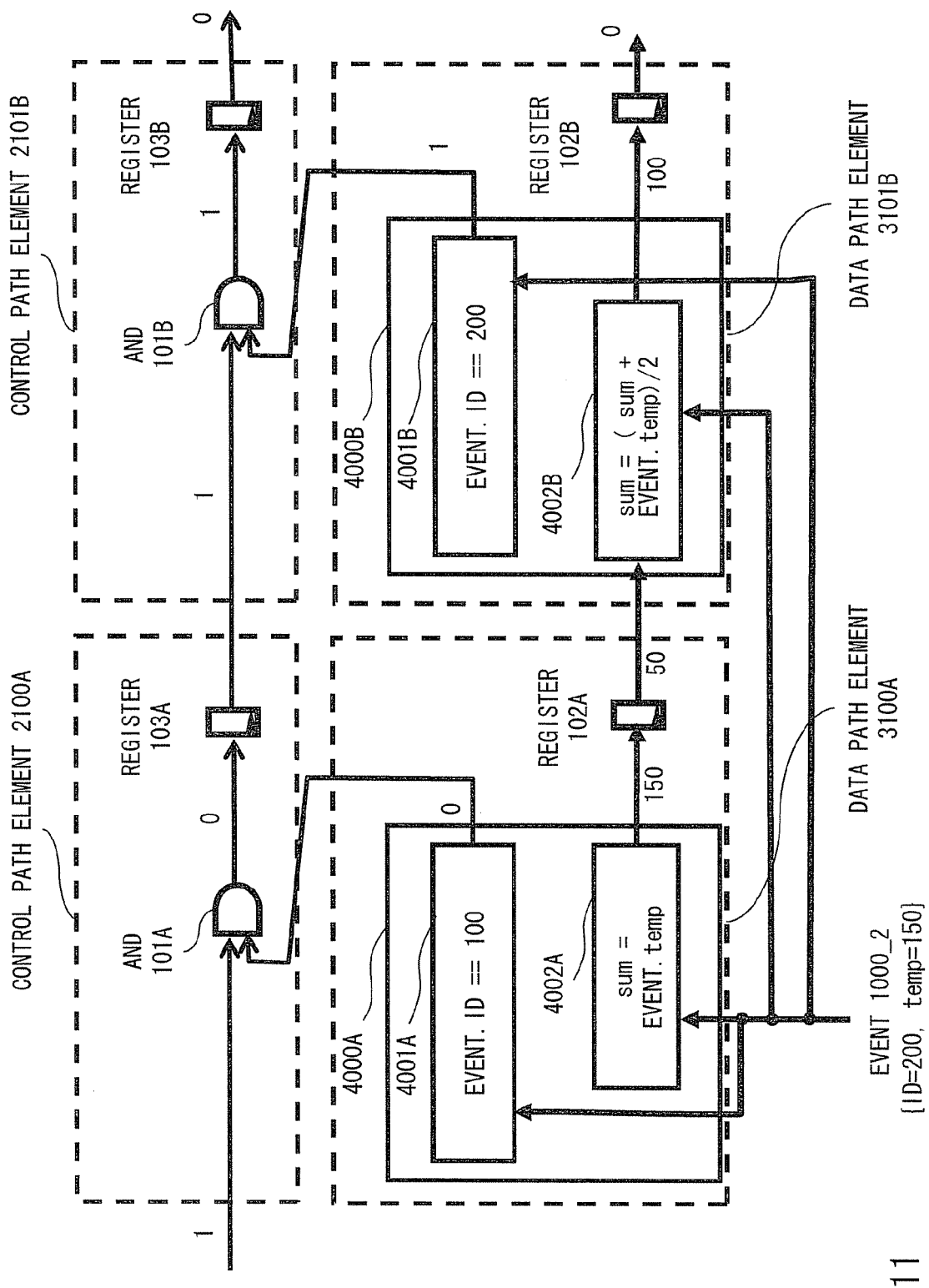
FIG. 11 is a diagram showing an exemplary operation of the computation device according to the third exemplary embodiment of the present invention which executes a computation of the concatenation of regular expressions shown in FIG. 9.

FIG. 11 is a diagram showing an exemplary operation of the computation device shown in FIG. 9. FIG. 11 shows an example in which an event 1000_2 having an ID of 200 and a temperature of 150 is supplied as an input to each of the function processing units 4000A and 4000B after the input of the event 1000_1 shown in FIG. 10. As a result, the output result of the control comparison unit 4001A indicates 0; the output result of the data calculation unit 4002A indicates 150; the output result of the AND 101A indicates 0; the output result of the control comparison unit 4001B indicates 1; the output result of the AND 101B indicates 1; and the output result of the data calculation unit 4002B indicates 100.

(3-3) Operation 3 (Event 1000_3{ID=300, Temp=0})

Figure 12:
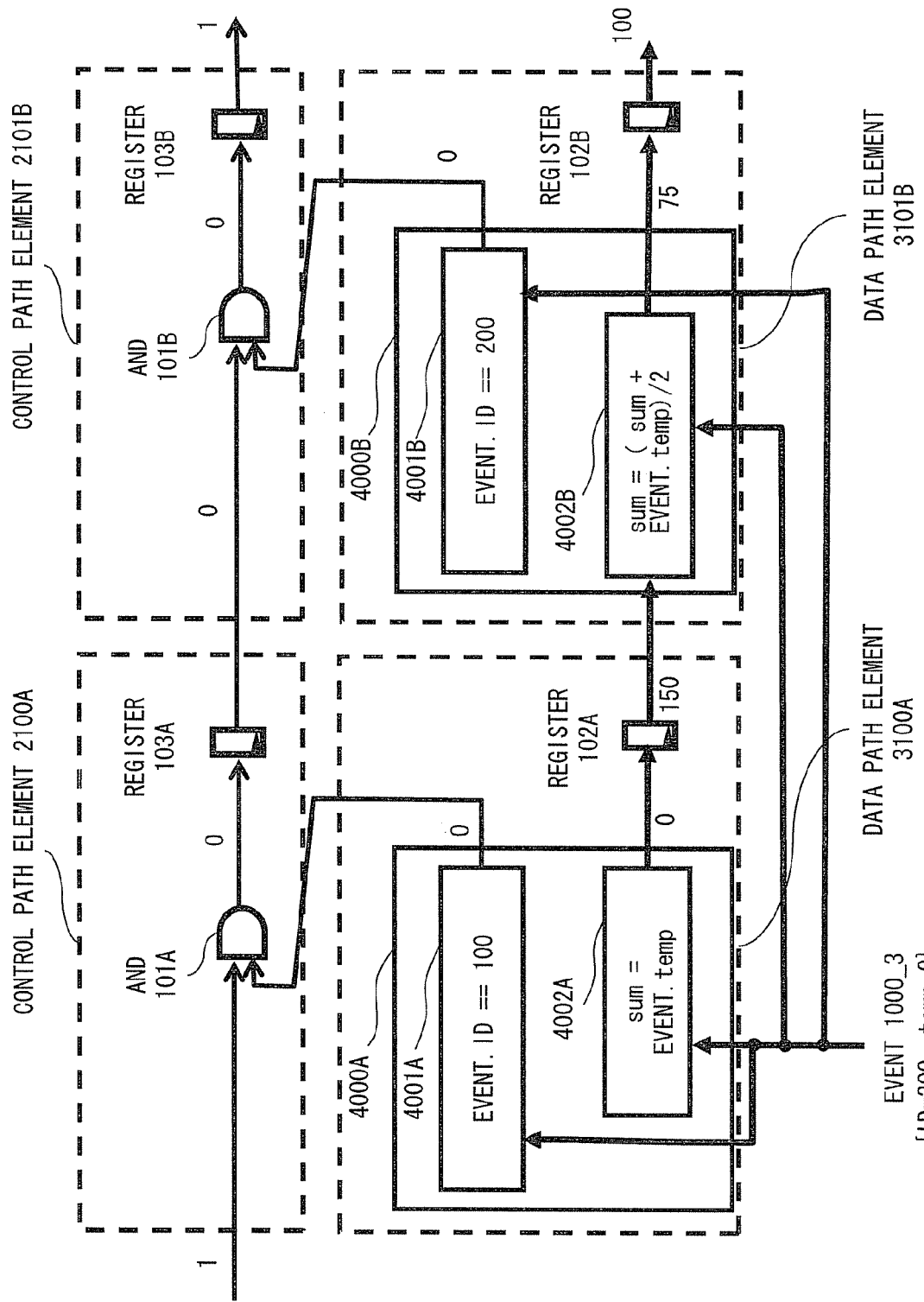
FIG. 12 is a diagram showing an exemplary operation of the computation device according to the third exemplary embodiment of the present invention which executes a computation of the concatenation of regular expressions shown in FIG. 9.

FIG. 12 is a diagram showing an exemplary operation of the computation device shown in FIG. 9. FIG. 12 shows an example in which an event 1000_3 having an ID of 300 and a temperature of 0 is supplied as an input to each of the function processing units 4000A and 4000B after the input of the event 1000_2 shown in FIG. 11. As a result, the output result of the control comparison unit 4001A indicates 0; the output result of the data calculation unit 4002A indicates 0; the output result of the AND 101A indicates 0; the output result of the control comparison unit 4001B indicates 0; the output result of the AND 101B indicates 0; and the output result of the data calculation unit 4002B indicates 75. In this example, the event detection result output from the register 103B of the control path element 2101B indicates 1, and the computation result of the function A(sum)B(sum) output from the register 102B register 102 of the data path element 3101B indicates 100. That is, the output of the register 103B is 1, which indicates that a match has occurred in this event sequence, i.e., indicates that a target event sequence has been detected. The output result of the register 102B shows that the average value (computation result) of the temperatures at that time is 100.

(3-4) Operation 4 (Event 1000_4{ID=300, Temp=0})

Figure 13:
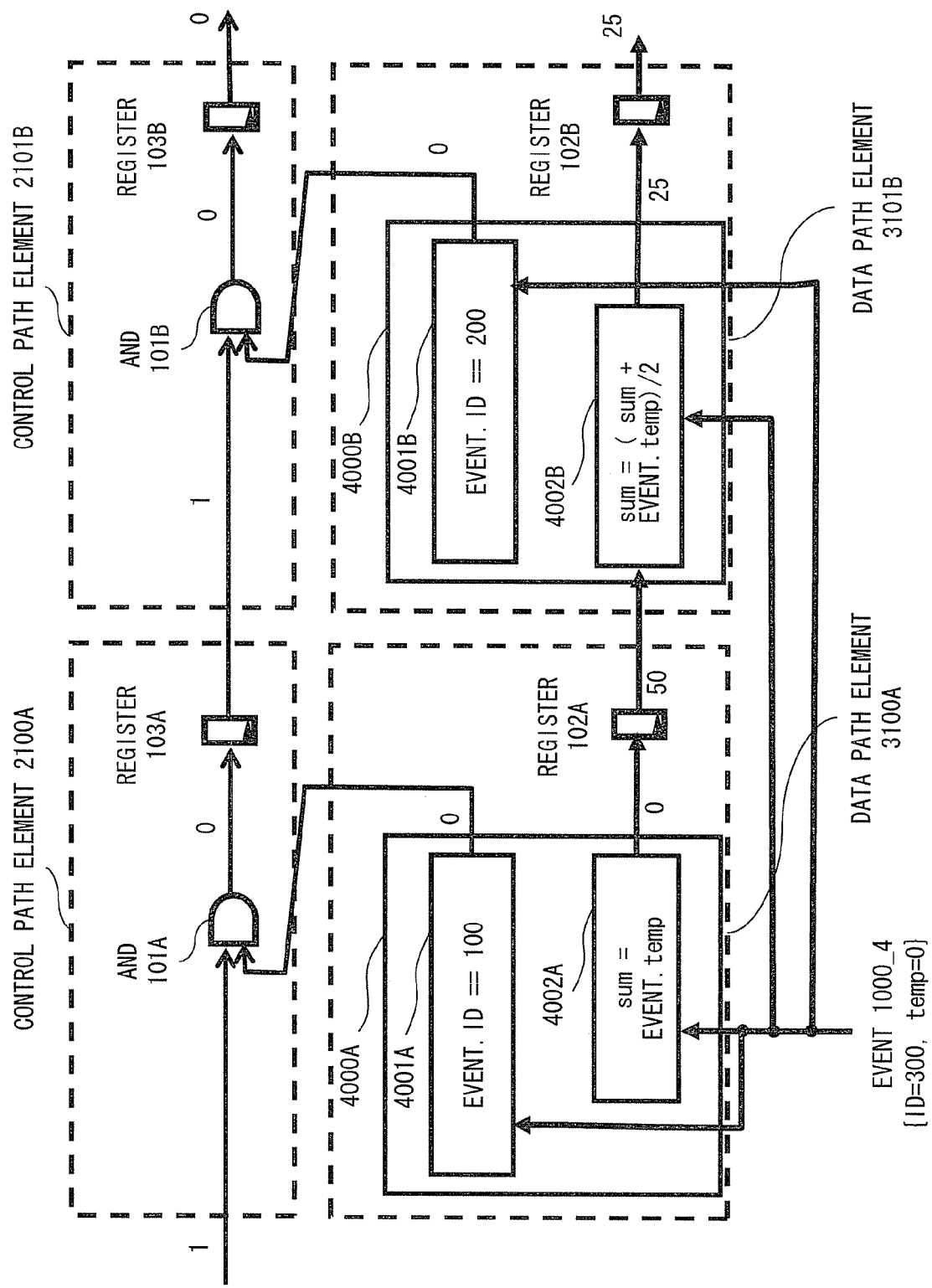
FIG. 13 is a diagram showing an exemplary operation of the computation device according to the third exemplary embodiment of the present invention which executes a computation of the concatenation of regular expressions shown in FIG. 9.

FIG. 13 is a diagram showing an exemplary operation of the concatenation of the computation device shown in FIG. 9. FIG. 13 shows an example in which an event 1000_4 having an ID of 300 and a temperature of 0 is supplied as an input to each of the function processing units 4000A and 4000B after the input of the event 1000_1 shown in FIG. 10. As a result, the output result of the control comparison unit 4001A indicates 0; the output result of the data calculation unit 4002A indicates 0; the output result of the AND 101A indicates 0; the output result of the control comparison unit 4001B indicates 0; the output result of the AND 101B indicates 0; and the output result of the data calculation unit 4002B indicates 25. In this case, the input event sequence does not match the function processing units 4000A and 4000B. Accordingly, the output of the register 103B is 0, and no event sequence is detected. In this case, the output result of the data calculation unit 4002B is treated as invalid data and is not adopted as a normal output result of this computation device.

As described above, the computation device according to this exemplary embodiment is capable of executing a computation of regular expressions described using the function A(sum)B(sum), detecting an event sequence matching the comparison result specified in the function, and outputting the comparison result obtained at that time.

In the computation device according to this exemplary embodiment, the control path elements 2100A and 2101B are connected as a concatenation and the data path elements 3100A and 3101B are connected as a concatenation in accordance with the rules shown in FIGS. 2, 3, and 5. This configuration enables computation of regular expressions described using the function A(sum)B(sum). The data path elements 3100A and 3101B include the control comparison units 4001A and 4001B, respectively, thereby enabling detection of an event sequence matching the comparison result specified in the function. The data path elements 3100A and 3101B also include the data calculation units 4002A and 4002B, respectively, thereby making it possible to execute a computation specified in each function and output the computation result.

(4) Fourth Exemplary Embodiment of the Present Invention

Next, a fourth exemplary embodiment of the present invention will be described. A computation device according to this exemplary embodiment has a configuration in which two computation devices according to the first exemplary embodiment are connected using the sum according to the second exemplary embodiment described above.

FIG. 14 is a diagram showing an example of the sum of regular expressions shown in the fourth exemplary embodiment of the present invention. As shown in FIG. 14, the regular expressions are described as the sum of functions A and B each having an argument yen (see the line "RULE"). An event is composed of event information including a currency name "currency" and a currency amount "amount".

In this case, the function A outputs the currency amount included in the event information to the argument yen. When the currency name in the input event is yen, the function A returns 1, and when the currency name is not 1, the function A returns 0. On the other hand, the function B outputs a value obtained by multiplying the currency amount in the input event by 80 to the argument yen. Then, when the currency name in the input event is dollar, the function B returns 1, and when the currency name is not 1, the function B returns 0. That is, this exemplary embodiment illustrates an example in which the currencies are unified into yen.

Figure 15:
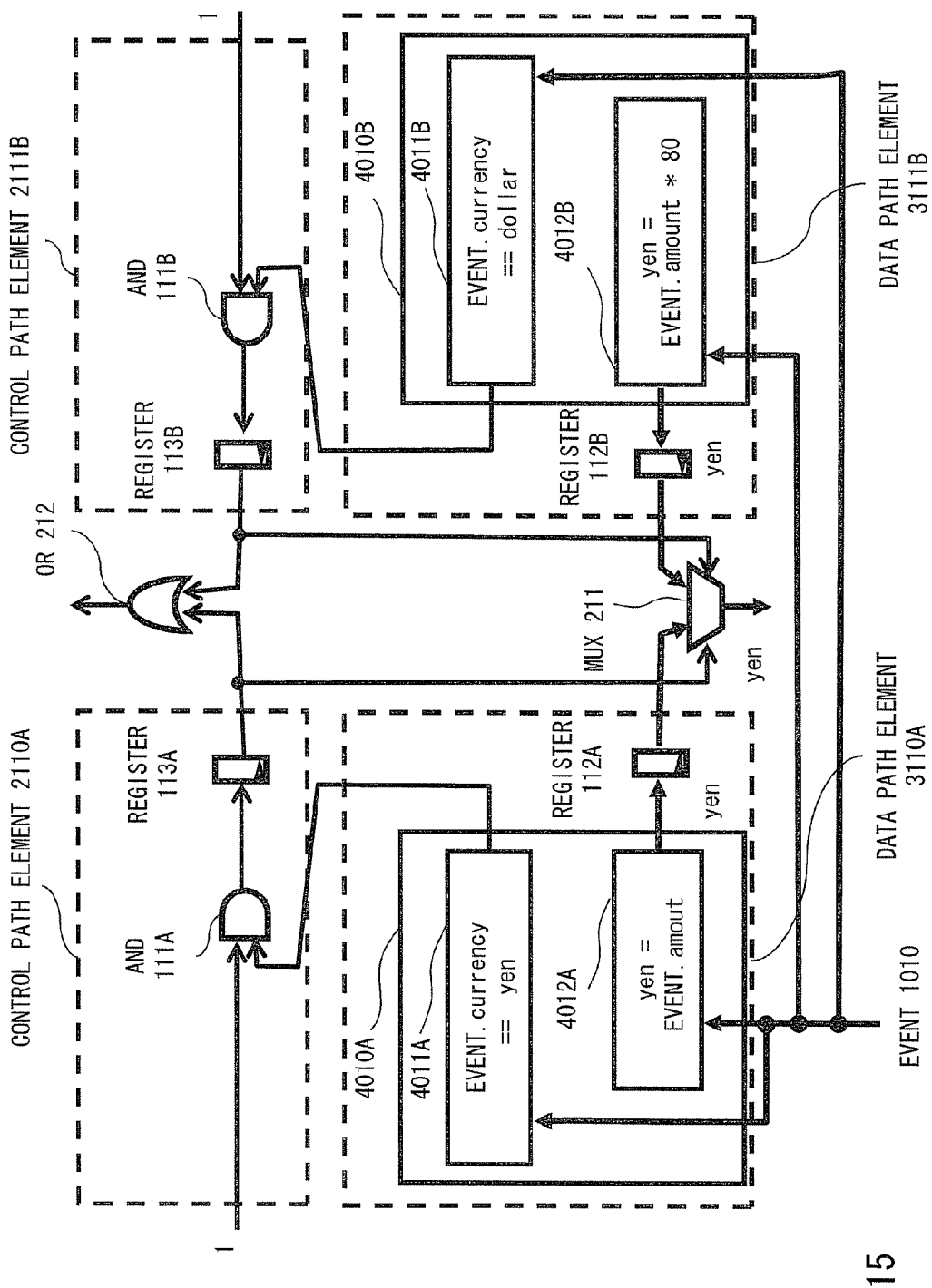
FIG. 15 is a diagram showing a computation device according to the fourth exemplary embodiment of the present invention which executes a computation of the sum of regular expressions shown in FIG. 14.

FIG. 15 is a diagram showing the computation device according to this exemplary embodiment which executes a computation of the sum of regular expressions shown in FIG. 14. As shown in FIG. 15, in accordance with the rules shown in FIGS. 2, 3, and 6, the computation device according to this exemplary embodiment has a configuration in which control path elements 2110A and 2111B are connected to through a logical OR (OR) 212 and data path elements 3110A and 3111B are connected through a multiplexer MUX 211.

The data path element 3110A includes a function 4010A and a register 112A. The data path element 3111B includes a function 4010B and a register 112B. The control path element 2110A includes an AND 111A and a register 113A. The control path element 2111B includes an AND 111B and a register 113B. The function 4010A includes a control comparison unit 4011A and a data calculation unit 4012A. The function 4010B includes a control comparison unit 4011B and a data calculation unit 4012B.

In this case, the control comparison unit 4011A of the function 4010A detects whether the currency name of the input event matches yen, and outputs the return value ret. The data calculation unit 4012A stores the currency amount "amount" of the input event into the output argument yen. On the other hand, the control comparison unit 4011B of the function 4010B detects whether the currency name of the input event matches dollar, and outputs the return value ret. The data calculation unit 4012B multiplies the currency amount "amount" of the input event by 80, and outputs the calculation result as yen. Note that the inputs of the control path elements 2110A and 2111B are fixed at 1, because there is no preceding result. The data path elements 3110A and 3111B are supplied with no value, because the data path elements 3110A and 3111B require no input from the preceding stage.

(4-1) Operation 1 (Event 1010_1 {Currency=Yen, Amount=100})

Figure 16:
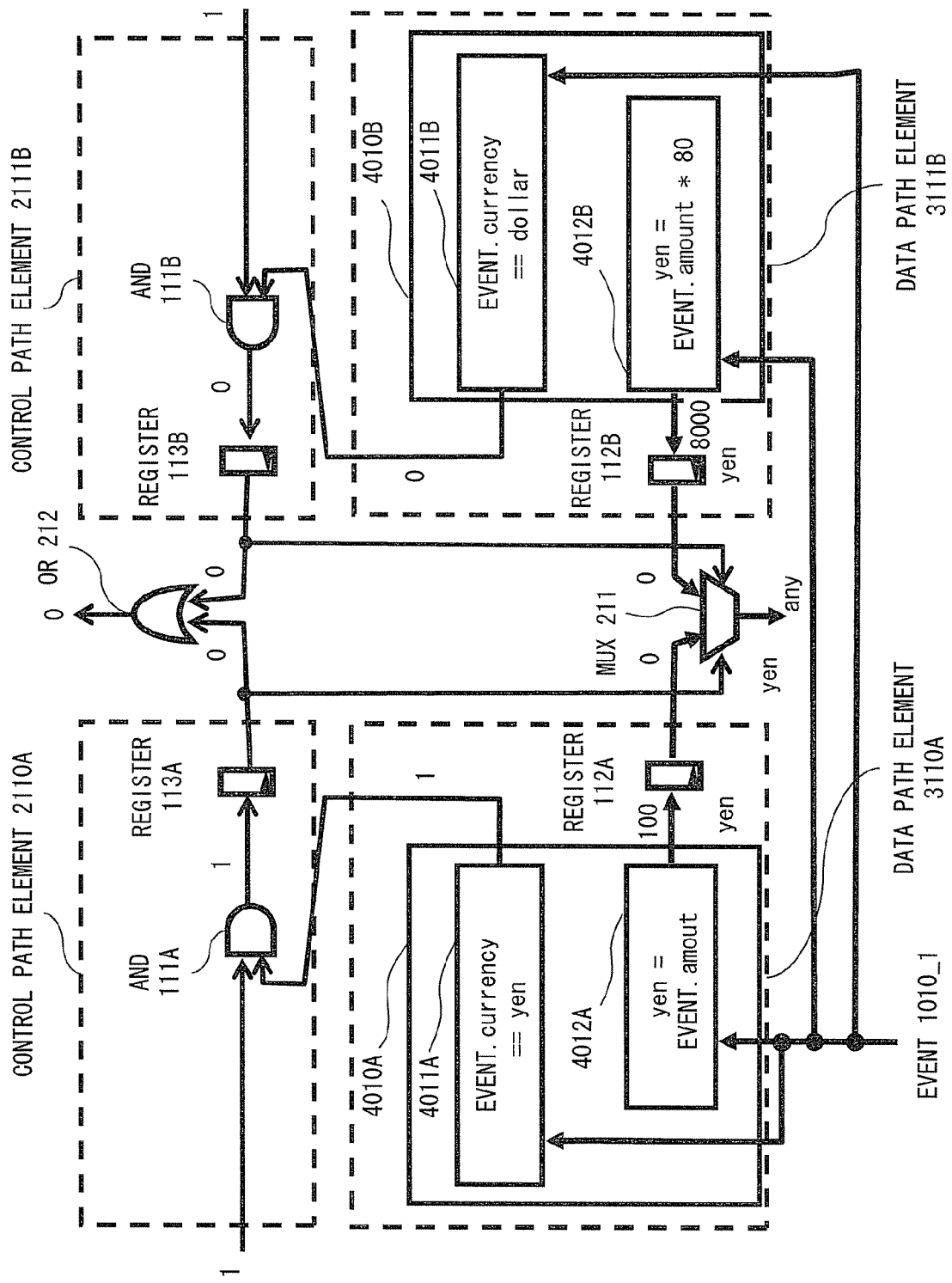
FIG. 16 is a diagram showing an exemplary operation of the computation device which executes a computation of the sum of regular expressions shown in FIG. 15.

Next, a method for processing an event sequence of the computation device according to this exemplary embodiment will be described. FIG. 16 is a diagram showing an exemplary operation of the computation device which executes a computation of the sum of regular expressions shown in FIG. 15. FIG. 16 shows an example in which an event 1010_1 having a currency name of yen and a currency amount of 100 is supplied as an input to each of the functions 4010A and 4010B. As a result, the output result of the control comparison unit 4011A indicates 1; the output result of the data calculation unit 4012A indicates 100; the output result of the AND 111A indicates 1; the output result of the control comparison unit 4011B indicates 0; the output result of the AND 111B indicates 0; and the output result of the data calculation unit 4012B indicates 8000.

(4-2) Operation 2 (Event 1010_2 {Currency=Yuan, Amount=5})

Figure 17:
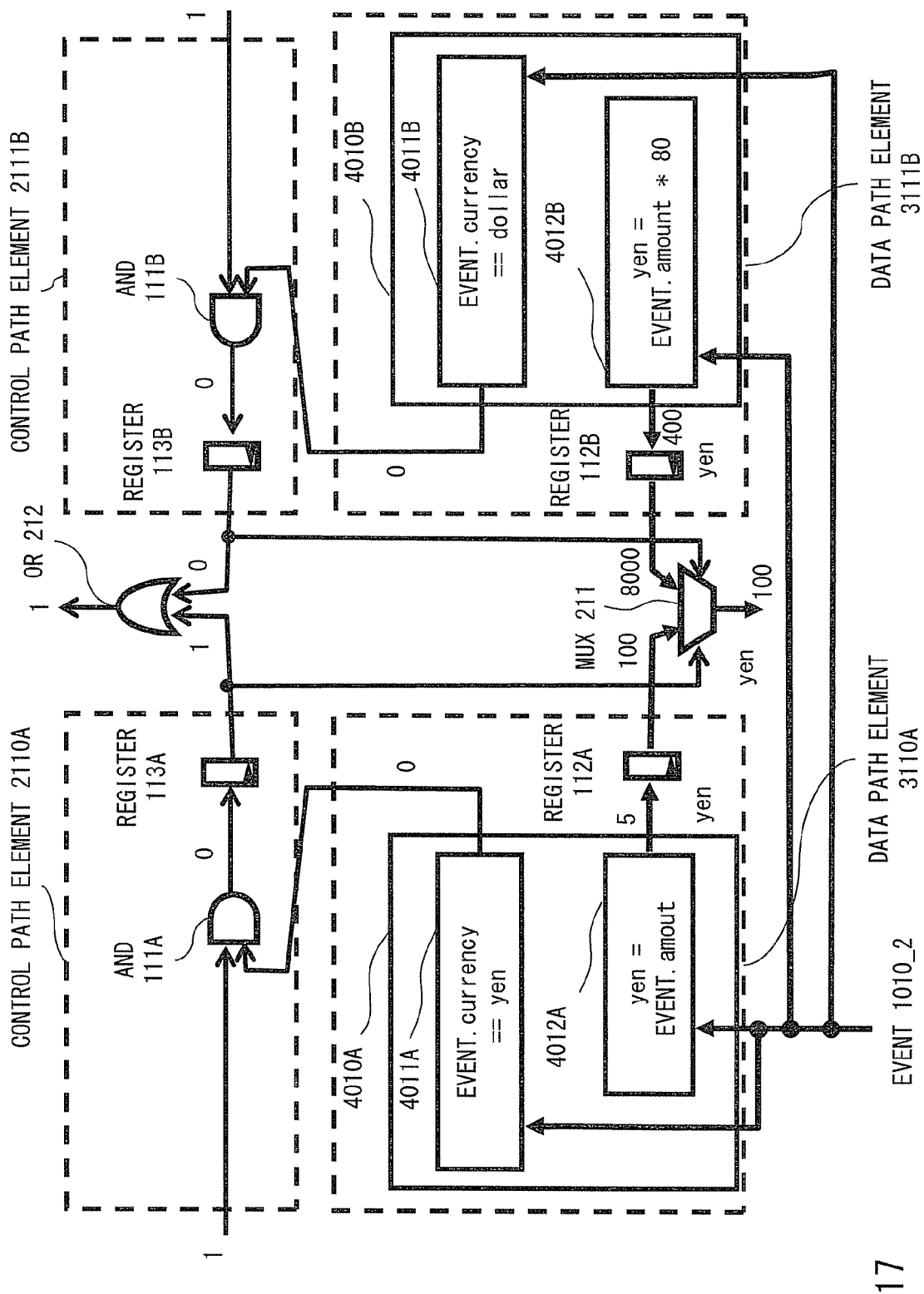
FIG. 17 is a diagram showing an exemplary operation of the computation device which executes a computation of the sum of regular expressions shown in FIG. 15.

FIG. 17 is a diagram showing an exemplary operation of the computation device which executes a computation of the sum of regular expressions shown in FIG. 15. FIG. 17 shows an example in which an event 1010_2 having a currency name of yuan and a currency amount of 5 is supplied as an input to each of the functions 4010A and 4010B as after the input of the event 1010_1 shown in FIG. 17. As a result, the output result of the control comparison unit 4011A indicates 0; the output result of the data calculation unit 4012A indicates 5; the output result of the AND 111A indicates 0; the output result of the control comparison unit 4011B indicates 0; the output result of the AND 111B indicates 0; and the output result of the data calculation unit 4012B indicates 400. In this case, the output of the OR 212 that outputs the event detection result is 1, which indicates that a match has occurred in the input event sequence, i.e., indicates that an event has been detected. Further, the output result of the multiplexer MUX 211 shows that the computation result of the regular expressions at that time, i.e., the amount of yen-denominated currency is 100.

(4-3) Operation 3 (Event 1010_3 {Currency=Dollar, Amount=10})

Figure 18:
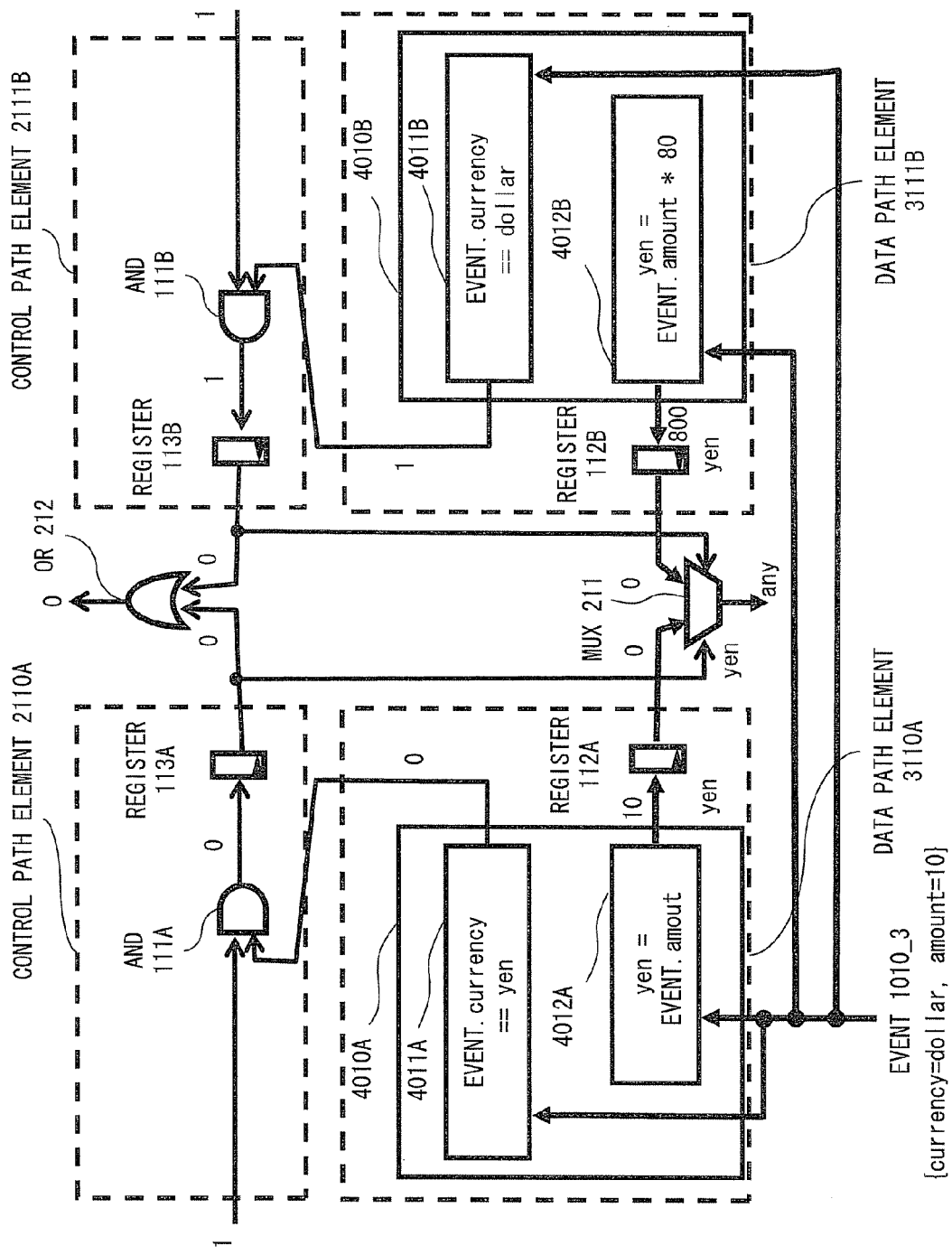
FIG. 18 is a diagram showing an exemplary operation of the computation device which executes a computation of the sum of regular expressions shown in FIG. 15.

FIG. 18 is a diagram showing an exemplary operation of the computation device which executes a computation of the sum of regular expressions shown in FIG. 15. FIG. 18 shows an example in which an event 1010_3 having a currency name of dollar and a currency amount of 10 is supplied as an input to each of the functions 4010A and 4010B. As a result, the output result of the control comparison unit 4011A indicates 0; the output result of the data calculation unit 4012A indicates 10; the output result of the AND 111A indicates 0; the output result of the control comparison unit 4011B indicates 1; the output result of the AND 111B indicates 1; and the output result of the data calculation unit 4012B indicates 800.

(4-4) Operation 4 (Event 1010_4{Currency=Yuan, Amount=5})

Figure 19:
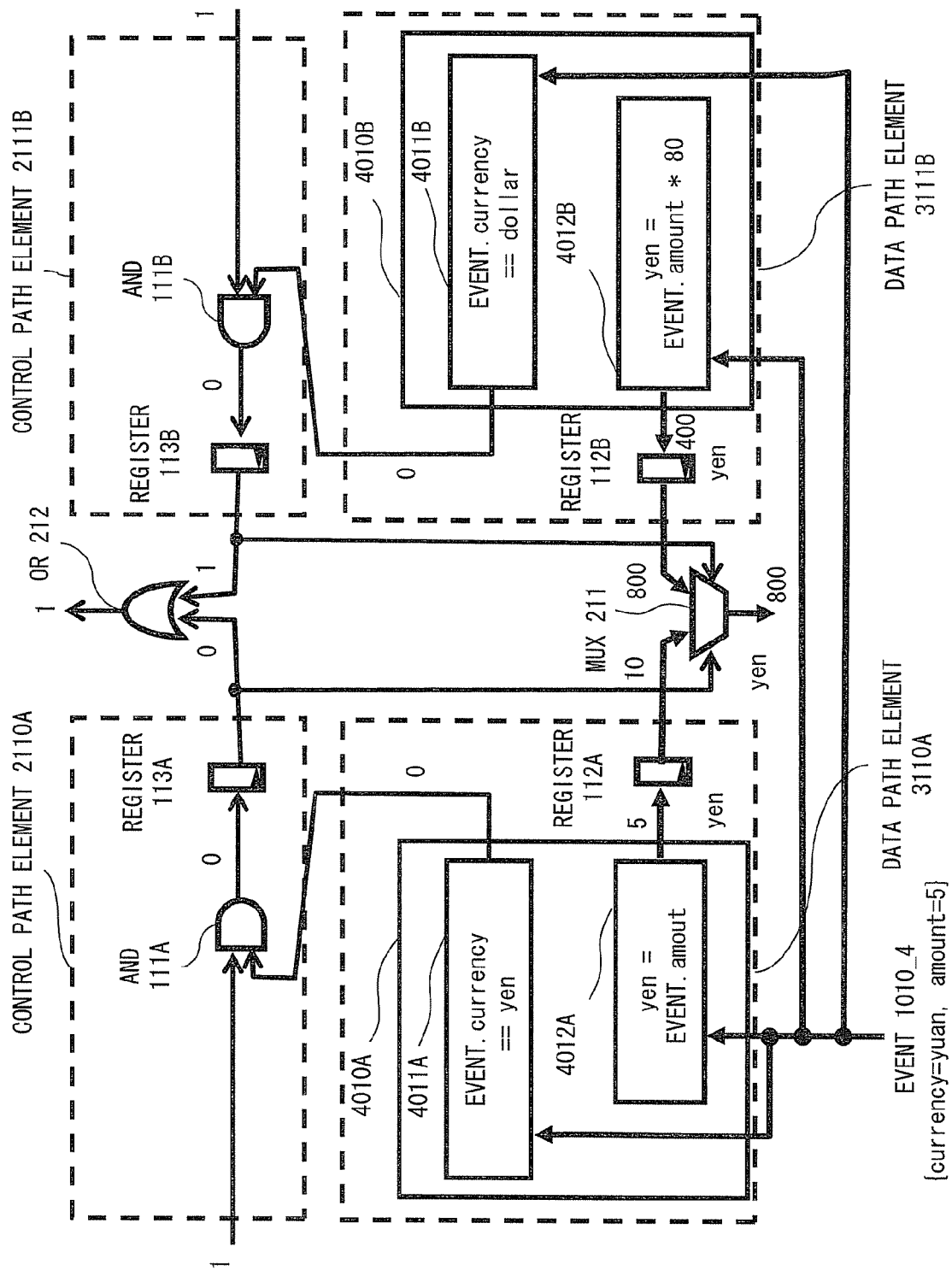
FIG. 19 is a diagram showing an exemplary operation of the computation device which executes a computation of the sum of regular expressions shown in FIG. 15.

FIG. 19 is a diagram showing an exemplary operation of the computation device which executes a computation of the sum of regular expressions shown in FIG. 15. FIG. 19 shows an example in which an event 1010_4 having a currency name of yuan and a currency amount of 5 is supplied as an input to each of the functions 4010A and 4010B after the input of the event 1010_3 shown in FIG. 18. As a result, the output result of the control comparison unit 4011A indicates 0; the output result of the data calculation unit 4012A is 5; the output result of the AND 111A indicates 0; the output result of the control comparison unit 4011B indicates 0; the output result of the AND 111B indicates 0; and the output result of the data calculation unit 4012B indicates 0. Also in this example, the output of the OR 212 indicating the event detection result is 1, which indicates that a match has occurred in the input event sequence. Further, the output result of the multiplexer MUX 211 shows that the computation result at that time, i.e., the amount of yen-denominated currency is 800.

(4-5) Operation 5 (Event 1010_5 {Currency=Yuan, Amount=5})

Figure 20:
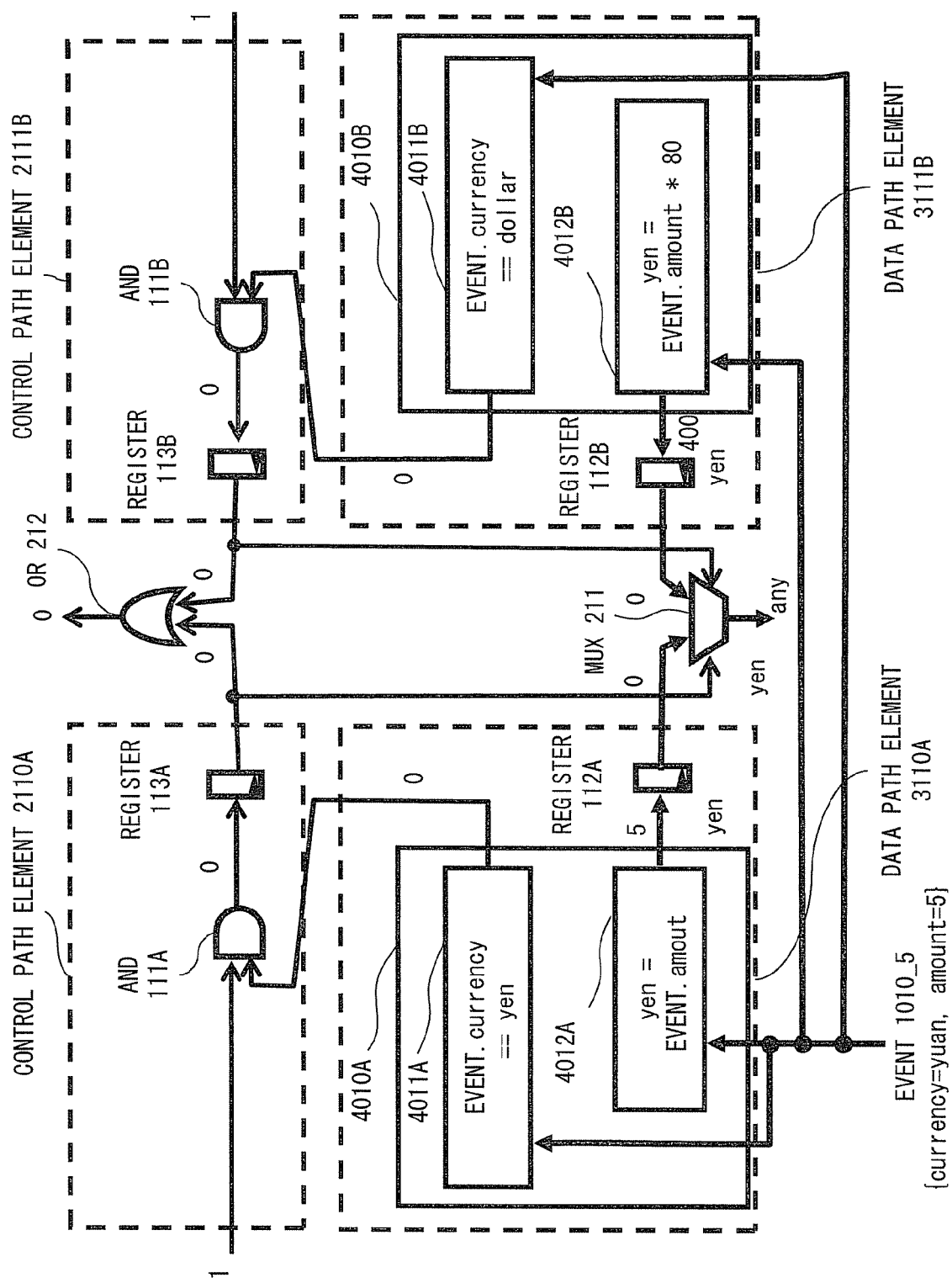
FIG. 20 is a diagram showing an exemplary operation of the computation device which executes a computation of the sum of regular expressions shown in FIG. 15.

FIG. 20 is a diagram showing an exemplary operation of the computation device which executes a computation of the sum of regular expressions shown in FIG. 15. FIG. 20 shows that an event 1010_5 having a currency name of yuan and a currency amount of 5 is supplied as an input to each of the functions 4010A and 4010B. As a result, the output result of the control comparison unit 4011A indicates 0; the output result of the data calculation unit 4012A indicates 5; the output result of the AND 111A indicates 0; the output result of the control comparison unit 4011B indicates 0; the output result of the AND 111B indicates 0; and the output result of the data calculation unit 4012B indicates 400. In this case, the event does not match the functions 4010A and 4010B. Accordingly, the output of the OR 212 is 0, and no event sequence is detected. In this case, the output results of the data calculation units 4012A and 4012B are treated as invalid data, and are not adopted as normal output results of this computation device.

In the computation device according to this exemplary embodiment, the control path elements 2110A and 2111B are connected as a sum and the data path elements 3110A and 3111B are connected as a sum in accordance with the rules shown in FIGS. 2, 3, and 6. This configuration enables computation of regular expressions described using a function A(sum)|B(sum). The data path elements 3110A and 3111B include the control comparison units 4011A and 4011B, respectively, thereby enabling detection of an event sequence matching the comparison result specified in the function. The data path elements 3110A and 3111B also include the data calculation units 4012A and 4012B, respectively, thereby making it possible to execute a computation specified in each function and output the computation result.

(5) Fifth Exemplary Embodiment of the Present Invention

Next, a fifth exemplary embodiment of the present invention will be described. A computation device according to this exemplary embodiment has a configuration in which two computation devices according to the first exemplary embodiment are connected using the sum described in the second exemplary embodiment.

FIG. 21 shows an example of a repetition in a regular expression shown in the fifth exemplary embodiment of the present invention. As shown in FIG. 21, the regular expression is described as a concatenation of a repetition of the function A having the total "total" of rainfall mount per second as an argument, and the function B for calculating an average per second of the integrated rainfall amount during rainy weather (see the line "RULE") by using the total "total" of rainfall amount per second as an input. An event is composed of event information including a weather condition "weather" and a rainfall amount per second "reinfall_amount". Assume that an event is sent per second.

In this case, the function A integrates and outputs the rainfall amount per second in the event information with "total". When the weather condition in the input event is rain, the function A returns 1, and when the weather condition is not rain, the function A returns 0. On the other hand, the function B uses the integration of the rainfall amount per second of the function A as an input, and outputs an average value of the number of events (integrated seconds), which have occurred so far, by a built-in function of get_num_event. When the weather condition of the input event is sunny, the function B returns 1, and when the weather condition is not sunny, the function B returns 0. That is, in this example, rainfall amounts per second during rainy weather before sunny weather are integrated, and the average thereof is output.

Figure 22:
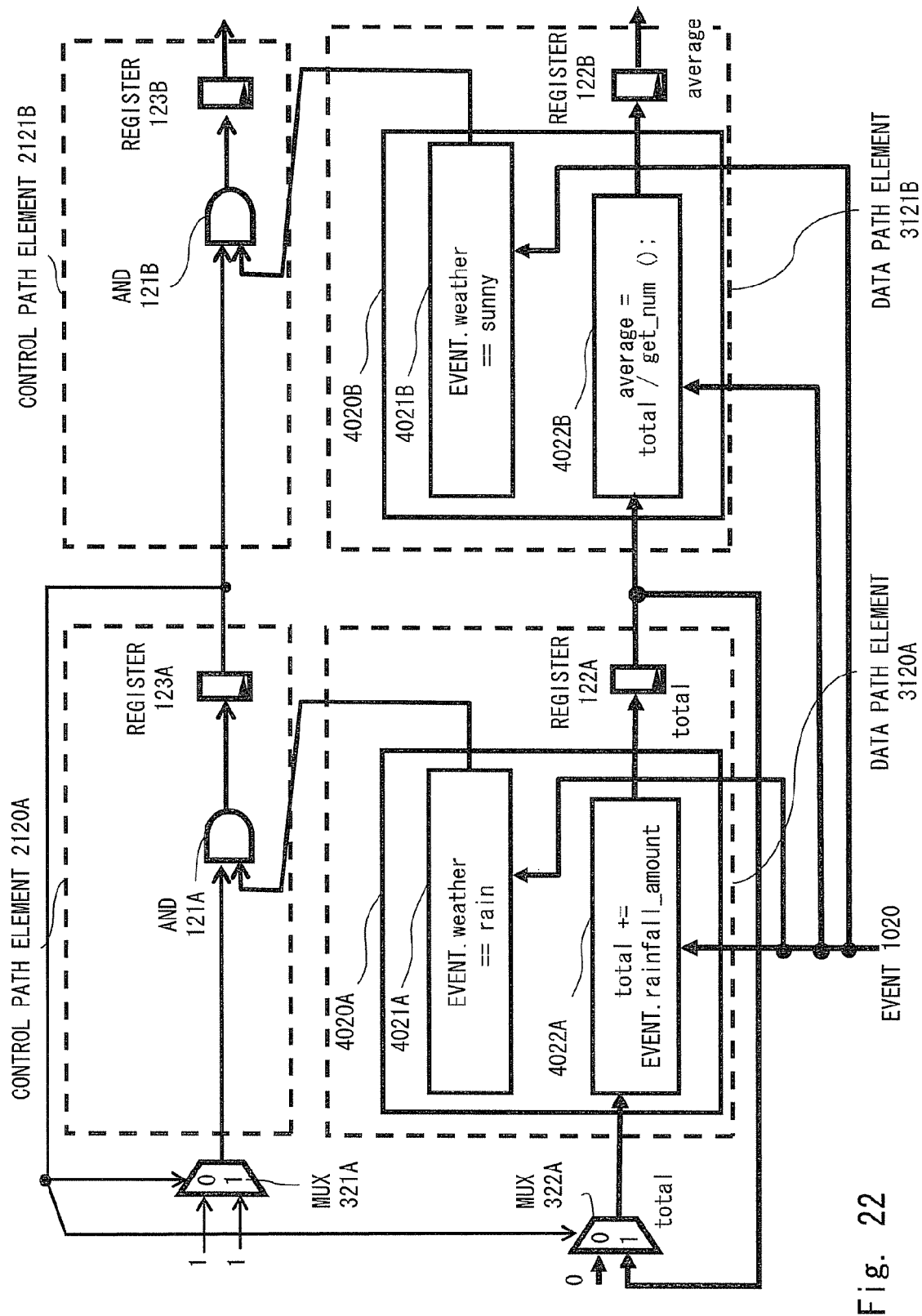
FIG. 22 is a diagram showing a computation device according to the fifth exemplary embodiment of the present invention which executes a computation of the repetition in the regular expression shown in FIG. 21.

FIG. 22 is a diagram showing the computation device according to this exemplary embodiment which executes a repetition computation in the regular expression shown in FIG. 21. As shown in FIG. 22, in accordance with the rules shown in FIGS. 2, 3, 5, and 7, the computation device according to this exemplary embodiment has a configuration in which control path elements 2120A and 2121B are connected as a repetition and data path elements 3120A and 3121B are connected as a repetition in the second exemplary embodiment.

The data path element 3120A includes a function 4020A and a register 122A. The data path element 3121B includes a function 4020B and a register 122B. The control path element 2120A includes an AND 121A and a register 123A. The control path element 2121B includes an AND 121B and a register 123B. The function 4020A includes a control comparison unit 4021A and a data calculation unit 4022A. The function 4020B includes a control comparison unit 4021B and a data calculation unit 4022B.

In this case, the control comparison unit 4021A of the function 4020A determines whether the weather condition of the input event matches "rain", and outputs the return value ret. The data calculation unit 4022A integrates rainfall amounts per second of the input event. On the other hand, the control comparison unit 4021B of the function 4020B determines whether the weather condition of the input event matches "sunny", and outputs the return value ret. The data calculation unit 4022B outputs the average rainfall amount per second during rainy weather, which is obtained by dividing the integrated rainfall amounts per second, which are the output of the function A, by the number of integrated seconds. Note that the input of the preceding value to a multiplexer MUX 321A is fixed at 1 because there is no preceding result, and the input of the preceding value to a multiplexer MUX 322A is fixed at 0 for the integration.

(5-1) Operation 1 (Event 1020_1 {Weather=Rain, Rainfall_Amount=10})

Figure 23:
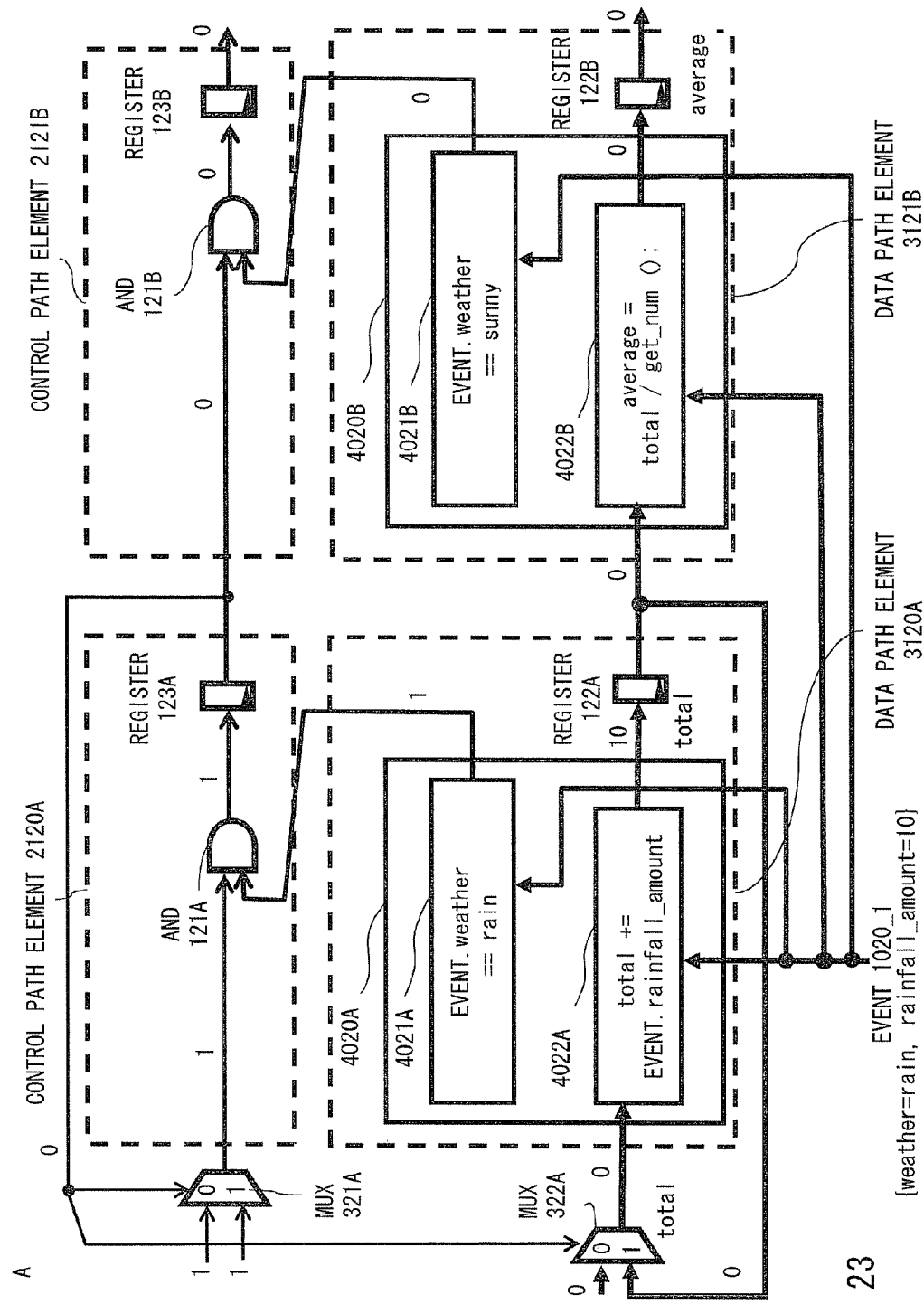
FIG. 23 is a diagram showing an exemplary operation of the computation device according to the fifth exemplary embodiment of the present invention which executes arithmetic processing for the repetition in the regular expression shown in FIG. 22.

Next, a method for processing an event sequence of the computation device according to this exemplary embodiment will be described. FIG. 23 is a diagram showing an exemplary operation of the computation device according to this exemplary embodiment which executes the arithmetic processing for the repetition in the regular expression shown in FIG. 22. FIG. 23 shows an example in which an event 1020_1 having a weather condition of rain and a rainfall amount per second of 10 is supplied as an input to each of the functions 4020A and 4020B. As a result, the output result of the control comparison unit 4021A indicates 1; the input of the data calculation unit 4022A indicates 0; the output result of the data calculation unit 4022A indicates 10; the output result of the AND 121A indicates 1; the output result of the control comparison unit 4021B indicates 0; the output result of the AND 121B indicates 0; and the output result of the data calculation unit 4022B indicates 0.

(5-2) Operation 2 (Event 1020_2 {Weather=Rain, Rainfall_Amount=20})

Figure 24:
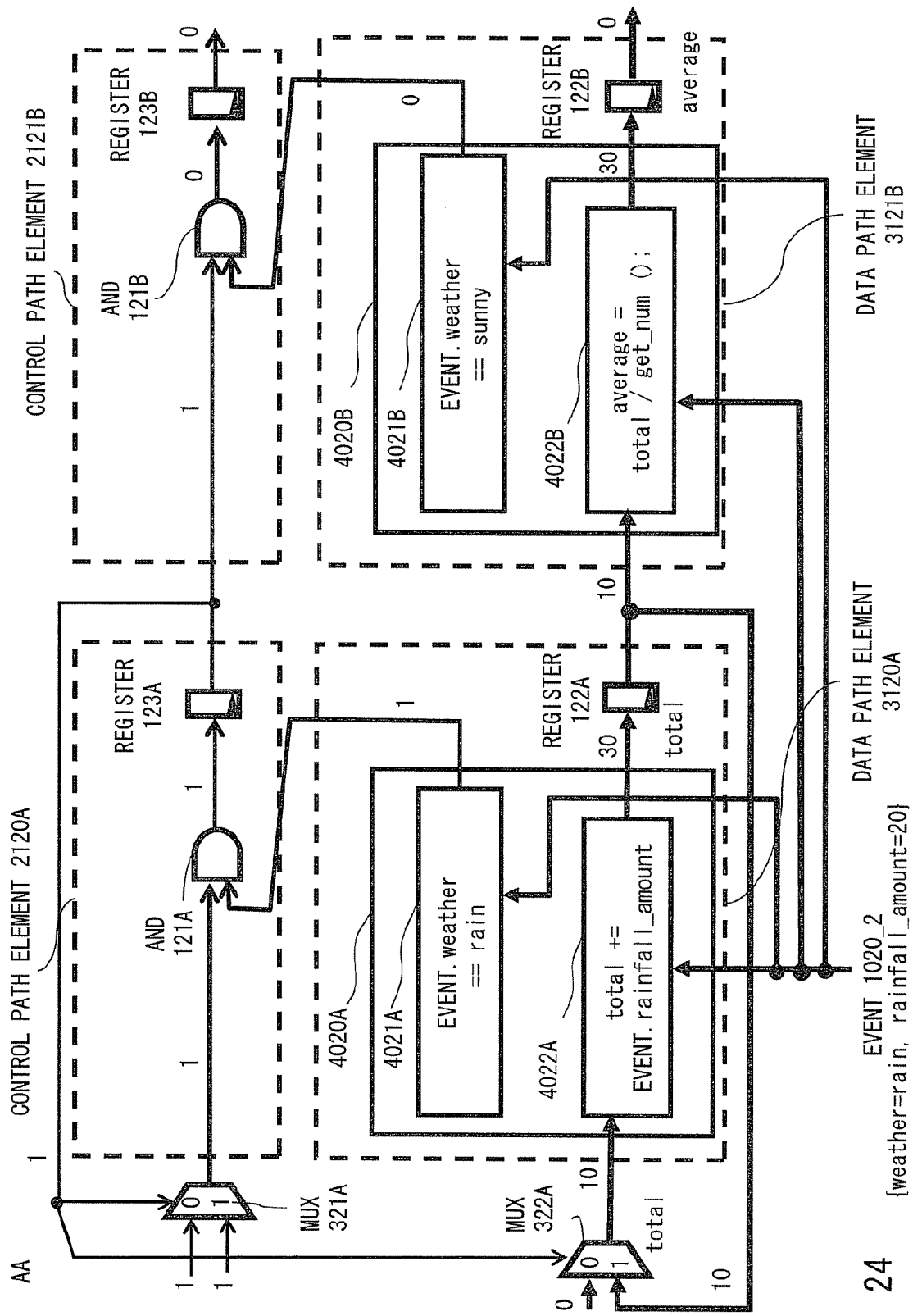
FIG. 24 is a diagram showing an exemplary operation of the computation device according to the fifth exemplary embodiment of the present invention which executes arithmetic processing for the repetition in the regular expression shown in FIG. 22.

FIG. 24 is a diagram showing an exemplary operation of the computation device according to this exemplary embodiment which executes arithmetic processing for the repetition in the regular expressions shown in FIG. 22. FIG. 24 shows an example in which an event 1020_2 having a weather condition of rain and a rainfall amount per second of 20 is supplied as an input to each of the functions 4020A and 4020B after the input of the event 1020_1 shown in FIG. 23. As a result, the output result of the control comparison unit 4021A indicates 1; the input of the data calculation unit 4022A indicates 10; the output result of the data calculation unit 4022A indicates 30; the output result of the AND 121A indicates 1; the output result of the control comparison unit 4021B indicates 0; the output result of the AND 121B indicates 0; and the output result of the data calculation unit 4012B indicates 30 because the number of integrated seconds is 1.

(5-3) Operation 3 (Event 1020_3 {Weather=Sunny, Rainfall_Amount=0})

Figure 25:
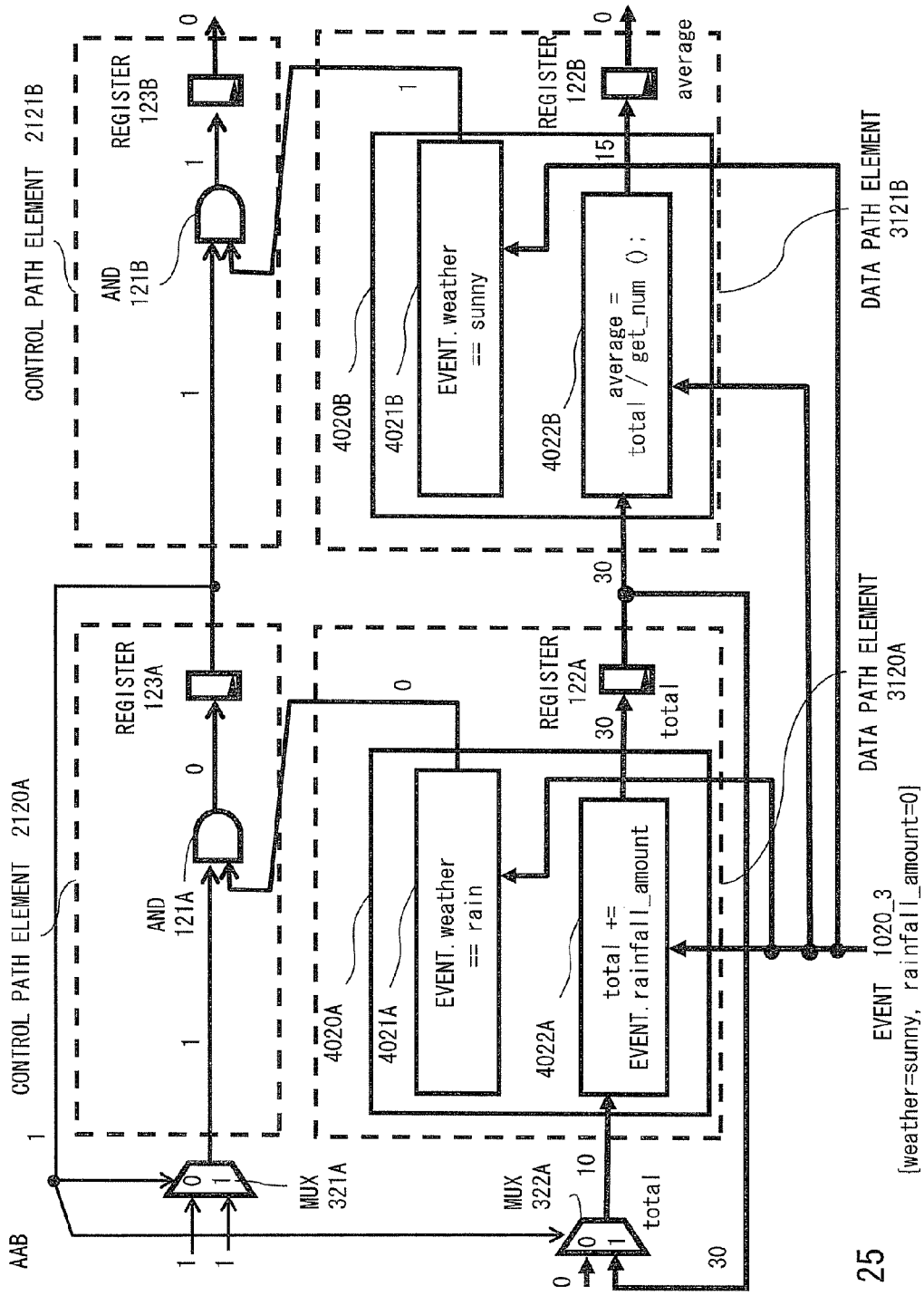
FIG. 25 is a diagram showing an exemplary operation of the computation device according to the fifth exemplary embodiment of the present invention which executes arithmetic processing for the repetition in the regular expression shown in FIG. 22.

FIG. 25 is a diagram showing an exemplary operation of the computation device according to this exemplary embodiment which executes arithmetic processing for the repetition in the regular expressions shown in FIG. 22. FIG. 25 shows that an event having a weather condition of sunny and a rainfall amount per second of 0 is supplied as an input to each of the functions 4020A and 4020B after the input of the event 1020_2 shown in FIG. 24. As a result, the output result of the control comparison unit 4021A indicates 0; the input of the data calculation unit 4022A indicates 30; the output result of the data calculation unit 4022A indicates 30; the output result of the AND 121A indicates 0; the output result of the control comparison unit 4021B indicates 1; the output result of the AND 121B indicates 1; and the output result of the data calculation unit 4012B indicates 15 because the number of integrated seconds is 2.

(5-4) Operation 4 (Event 10_4{Weather=Cloudy, Rainfall_Amount=0})

Figure 26:
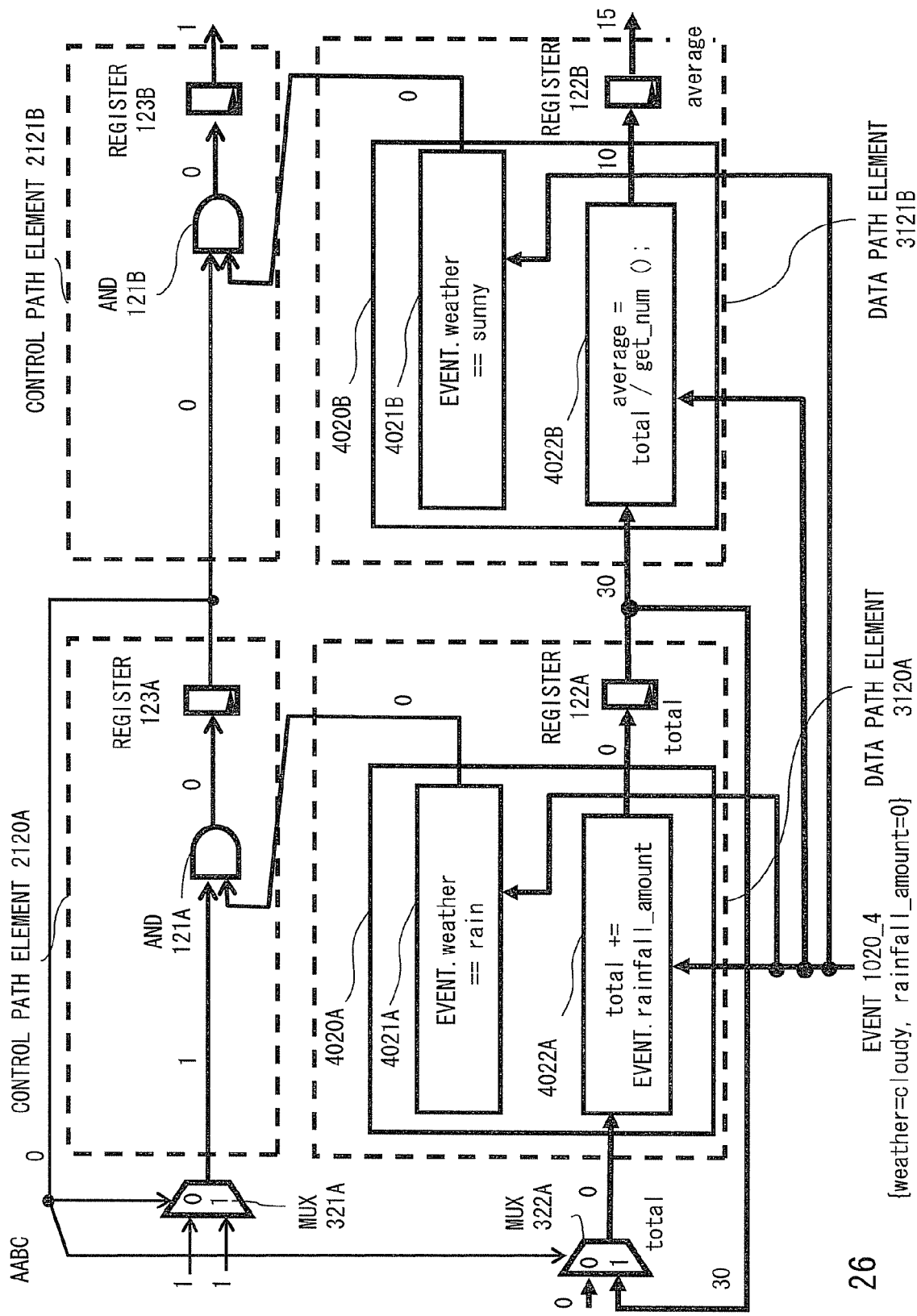
FIG. 26 is a diagram showing an exemplary operation of the computation device according to the fifth exemplary embodiment of the present invention which executes arithmetic processing for the repetition in the regular expression shown in FIG. 22.

FIG. 26 is a diagram showing an exemplary operation of the computation device according to this exemplary embodiment which executes arithmetic processing for the repetition in the regular expression shown in FIG. 22. FIG. 26 shows an example in which an event 1020_4 having a weather condition of cloudy and a rainfall amount per second of 0 is supplied as an input to each of the functions 4020A and 4020B after the input of the event 1020_3 shown in FIG. 25. As a result, the output result of the control comparison unit 4021A indicates 0; the input of the data calculation unit 4022A indicates 0; the output result of the data calculation unit 4022A indicates 0; the output result of the AND 121A indicates 0; the output result of the control comparison unit 4021B indicates 0; the output result of the AND 121B indicates 0; the output result of the data calculation unit 4022B indicates 10 because the number of integrated seconds is 1. In this regard, however, the output of the register 123B indicating the event detection result is 1, which indicates that a match has occurred in the input event sequence, i.e., indicates that an event has been detected. Further, the output result of the register 122B shows that the average of the integrated rainfall amounts per second at that time is 15.

(5-5) Operation 5 (Event 1010{Weather=Cloudy, Rainfall_Amount=0})

Figure 27:
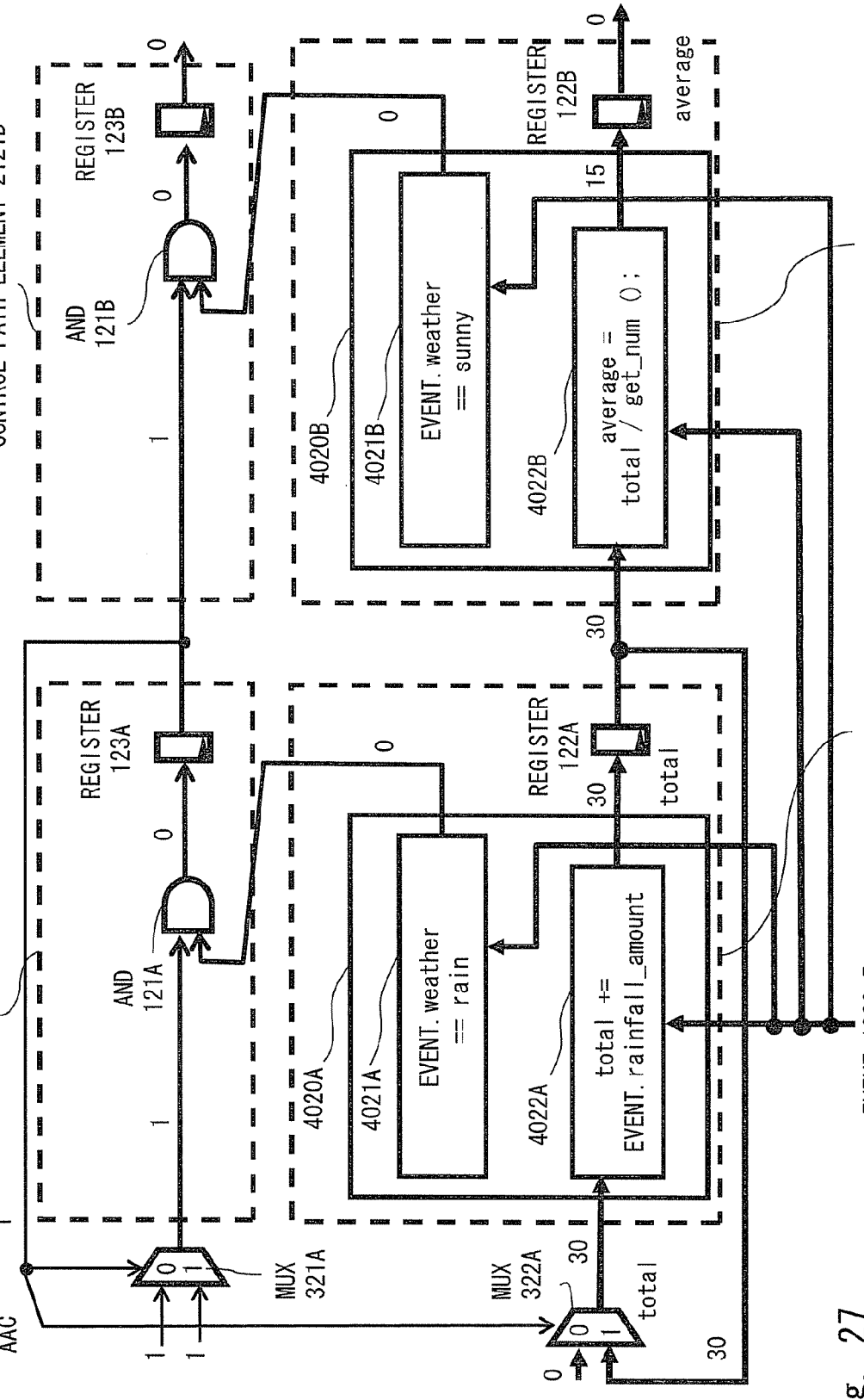
FIG. 27 is a diagram showing an exemplary operation of the computation device according to the fifth exemplary embodiment of the present invention which executes arithmetic processing for the repetition in the regular expression shown in FIG. 22.

FIG. 27 is a diagram showing an exemplary operation of the computation device according to this exemplary embodiment which executes arithmetic processing for the repetition in the regular expression shown in FIG. 22. FIG. 27 shows an example in which an event 1010_5 having a weather condition of cloudy and a rainfall amount per second of 0 is supplied as an input to each of the functions 4020A and 4020B after the input of the event 1020_1 shown in FIG. 24. As a result, the output result of the control comparison unit 4021A indicates 0; the input of the data calculation unit 4022A indicates 30; the output result of the data calculation unit 4022A indicates 30; the output result of the AND 121A indicates 0; the output result of the control comparison unit 4021B indicates 0; the output result of the AND 121B indicates 0; and the output result of the data calculation unit 4022B indicates 15 because the number of integrated seconds is 2. However, this event does not match the functions 4020A and 4020B. Accordingly, the output of the register 123B indicating the event detection result is 0, and no event sequence is detected. In this case, the output result of the data calculation unit 4022B is treated as invalid data and is not adopted as a normal output result of this computation device.

In accordance with the rules shown in FIGS. 2, 3, 5, and 7, the computation device according to this exemplary embodiment has a configuration in which the repetition of the control path element 2120A and the control path element 2121B are connected as a concatenation and the repetition of the data path element 3120A and the data path element 3121B are connected as a concatenation. This configuration enables computation of regular expressions described using a function A(sum)+B(sum). The data path elements 3120A and 3121B include the control comparison units 4021A and 4021B, respectively, thereby enabling detection of an event sequence matching the comparison result specified in the function. The data path elements 3120A and 3120B also include the data calculation units 4022A and 4022B, respectively, thereby making it possible to execute a computation specified in each function and output the computation result.

(6) Sixth Exemplary Embodiment of the Present Invention

In the exemplary embodiments described above, the return value of each function is 1-bit information representing a truth value. The return value of each function may be extended to a plurality of bits. This exemplary embodiment shows an example in which the return value of each function executed by the computation device has a plurality of bits.

As a specific example in which the return value of each function is represented by a plurality of bits, the return value may indicate a probability of occurrence of each event. In other words, the return value of each function indicates a probability of occurrence of each event, instead of indicating the presence or absence of occurrence of each event. The probability of occurrence of each event can also be interpreted as a possibility of occurrence of each event. Since the probability of occurrence of each event can be defined in this manner, the probability of occurrence of each event sequence can also be defined.

The return value representing the probability of occurrence of each event can be obtained as follows. When data (event information) included in an event indicates a value that follows a physical fluctuation, for example, when the data indicates a temperature in a heat source, the probability of occurrence of the temperature can be obtained in accordance with a probability distribution which is calculated in advance based on the physical law related to the heat source. When the event information indicates data that does not follow the physical law, for example, in terms of a test or the like, a well-known distribution, such as a logistic distribution or a normal distribution, can be assumed and the probability of occurrence can be calculated from the distribution. Further, the probability of occurrence of the current event may be calculated according to the frequency of data generated in the previous event sequence. In addition, any method, such as a Bayesian method and a maximum likelihood method, may be employed to calculate the probability of occurrence of each event, as long as the method is used in the statistic calculation and data mining fields.

When each return value has a plurality of bits, a logic computation of return values cannot be defined as in the first to fifth exemplary embodiments. A specific example of a method for computing return values having a plurality of bits will be described below.

Figure 28:
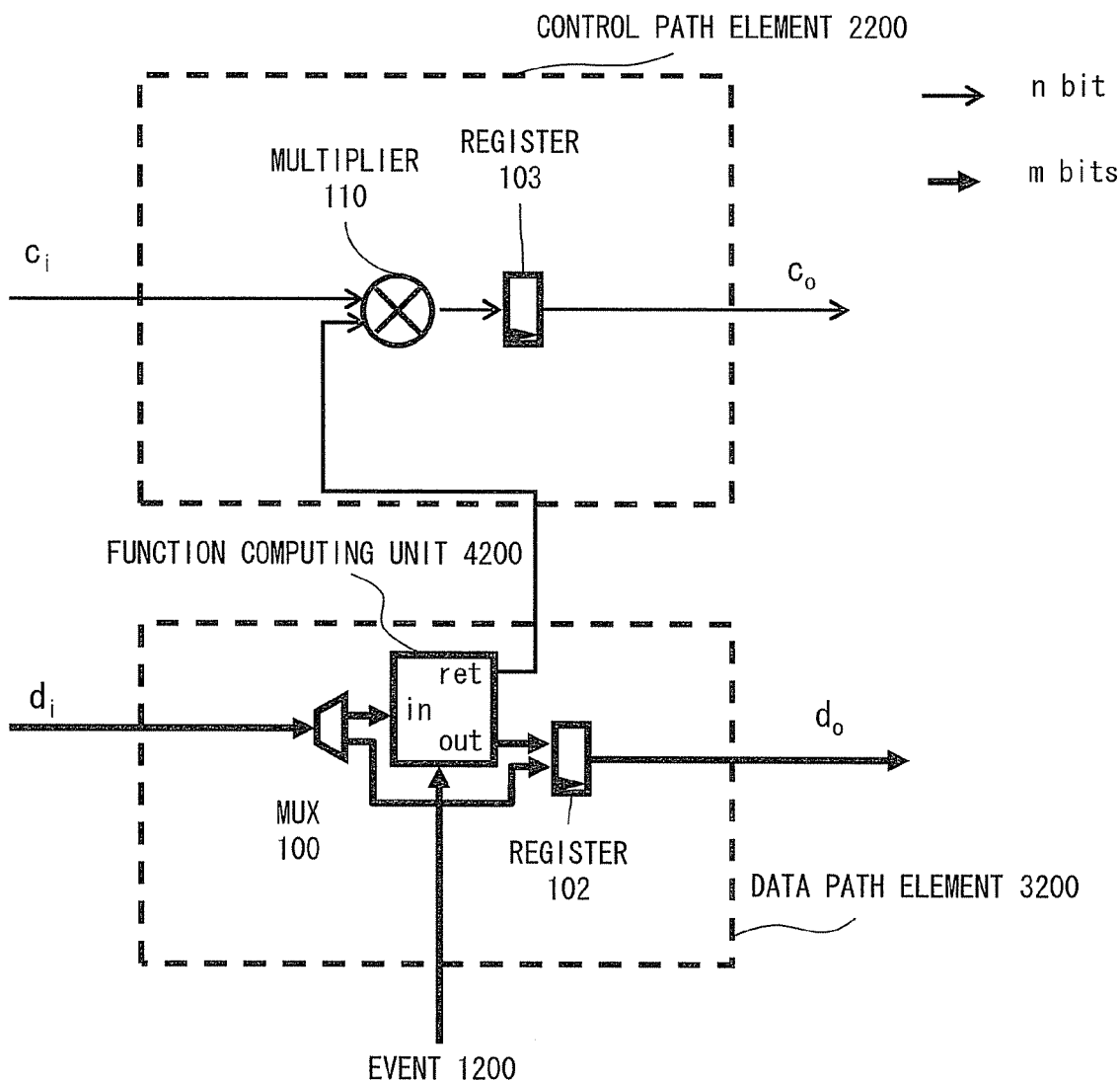
FIG. 28 is a diagram showing a computation device according to a sixth exemplary embodiment of the present invention which executes a function when a return value of the function has a plurality of bits.

This exemplary embodiment will be described assuming that an event sequence occurring at a certain probability or higher is detected. FIG. 28 is a diagram showing the computation device according to this exemplary embodiment which executes a function when the return value of the function has a plurality of bits. Assume herein that the plurality of bits represents the probability of occurrence of the event of this function. Unlike in FIG. 2, when the probability of occurrence of the event is defined as a return value, a multiplier 110 is provided as shown in FIG. 28, in place of the AND 101 which is the logical OR between the result $c_i$ of the preceding-stage control path element and the result from the function computing unit 4200. When this multiplier outputs the product of the event occurrence probability $c_i$ of the preceding-stage control path element and the event occurrence probability ret from the function computing unit 4200, the register 103 outputs the occurrence probability $c_0$ of the event sequence itself. The return value ret of the function may represent not only the probability of occurrence of each event, but also other states. In this case, a different computing unit may be provided in place of the multiplier.

Figure 29A:
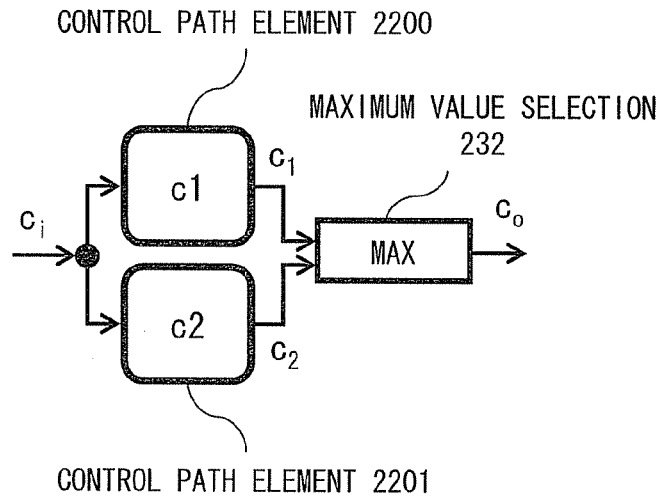
FIG. 29A is a diagram for explaining connection of control path elements in the case of computing a sum with respect to a function having a return value of a plurality of bits.
Figure 29B:
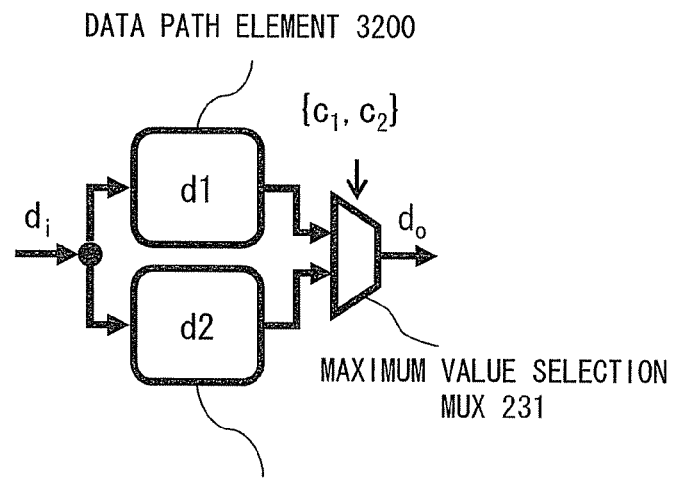
FIG. 29B is a diagram for explaining connection of data path elements in the case of computing a sum with respect to a function having a return value of a plurality of bits.

In this manner, when the return value of each function is defined as a plurality of bits, a difference in configuration between the sum and repetition rules occurs in the rules of regular expressions. FIGS. 29A and 29B are diagrams respectively illustrating connection of control path elements and connection of data path elements in the case of computing a sum with respect to a function having a return value of a plurality of bits. Unlike in FIGS. 6A and 6B, a maximum value selection computing unit 232 that selects and outputs a larger value of the control path element 2200 and the control path element 2201 is provided as shown in FIG. 29A, instead of performing the logical OR 202 of the results of the control path element 2200 and the control path element 2201. This means that a function having output a larger probability of occurrence of an event is to be selected.

With this configuration, the output $d_1$ of the data path element 3200 and the output $d_2$ of the data path element 3201 are selected depending on the size of each of the output results $c_1$ and $c_2$ of the control path elements 2200 and 2201 (FIG. 29B). Specifically, a maximum value selection MUX 231 selects the output $d_1$ when the output result $c_1$ is larger, and selects the output $d_2$ when the output result $c_2$ is larger, and then outputs the output $d_0$.

Note that the selection conditions in the maximum value selection computing unit 232 and the maximum value selection MUX 231 are illustrated by way of example only, and a function or an output result may be selected based on a conditional judgment other than the above-mentioned conditions.

Figure 30A:
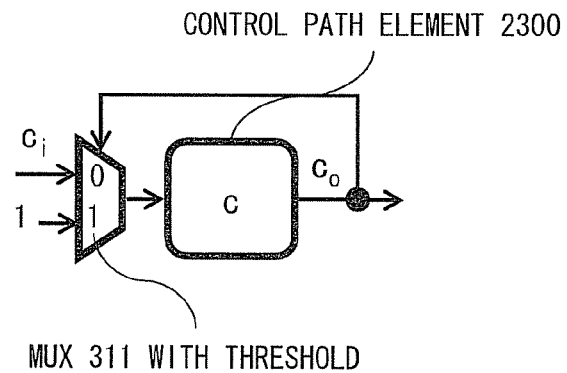
FIG. 30A is a diagram for explaining connection of control path elements in the case of computing a repetition with respect to a function having a return value of a plurality of bits.
Figure 30B:
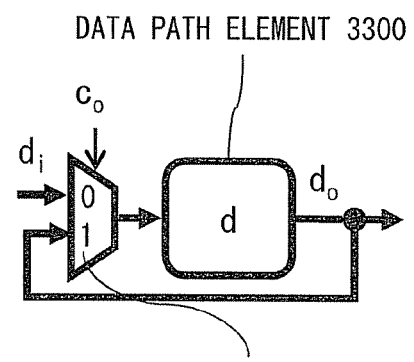
FIG. 30B is a diagram for explaining connection of data path elements in the case of computing a repetition with respect to a function having a return value of a plurality of bits.

FIGS. 30A and 30B are diagrams respectively illustrating connection of control path elements and connection of data path elements in the case of computing a repetition for a function having a return value of a plurality of bits. Unlike in FIGS. 7A and 7B, MUXs 311 and 312 with threshold, each of which selects an input based on whether the probability of occurrence of each event exceeds a certain threshold or not, are provided as inputs of the control path element 2300 and the data path element 3300, instead of using MUXs. Specifically, when the probability of continuous occurrence of events that repeatedly occur is lower than a certain threshold, even if there is a sufficient probability of occurrence of a single event, the results $c_i$ and $d_i$ of the control path element and the data path element from the preceding stage are selected and input thereafter. That is, even if the probability of occurrence of a single event is 80%, for example, a repetition of 10 times indicates a probability of 10%.

In this exemplary embodiment, the computation device that performs arithmetic processing for regular expressions of each function can also deal with the case where the return value of each function is represented by a plurality of bits. Accordingly, the processing can be performed based not only on the presence or absence of occurrence of an event sequence, but also on the probability of occurrence of an event sequence. Specifically, a computation corresponding to each event constituting an event sequence can be executed, and an appropriate computation result can be output based on the probability of occurrence of an event sequence.

(7) Seventh Exemplary Embodiment of the Present Invention

Next, a seventh exemplary embodiment of the present invention will be described. A computation device according to this exemplary embodiment treats an operation stop request received from a computation device located at the subsequent stage, and deals with the difference in the number of cycles of the function computation in each computation device.

Figure 31:
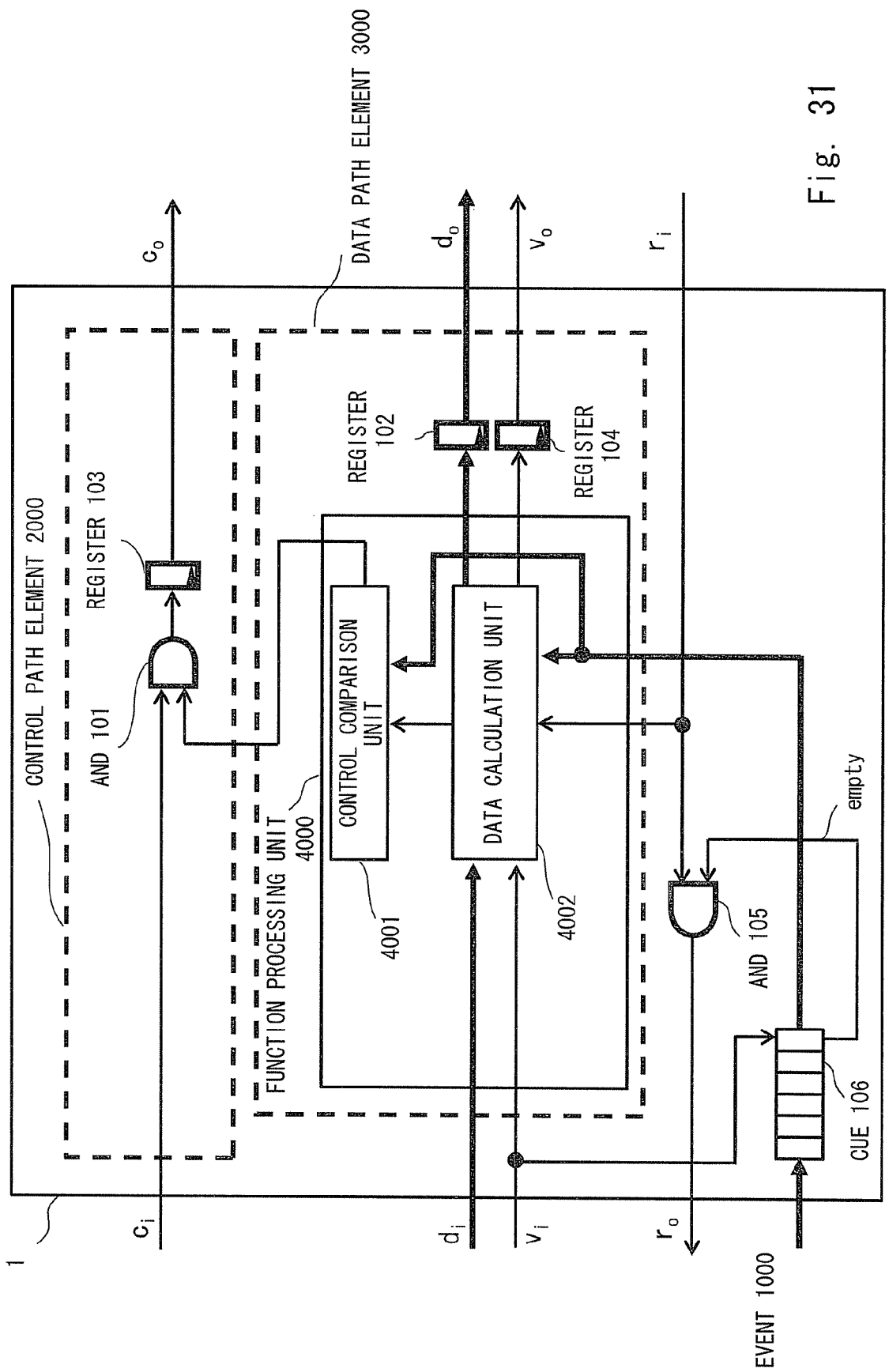
FIG. 31 is a diagram showing a computation device according to a seventh exemplary embodiment of the present invention which treats a ready signal and a valid signal.

FIG. 31 is a diagram showing the configuration of the computation device according to this exemplary embodiment. Note that in FIG. 31, the processing units, which are denoted by the same name and the same reference numeral and the description of which is omitted hereinafter, perform basically the same processing as that of the first and second exemplary embodiments.

As with the configuration shown in FIG. 2, the computation device 1 according to this exemplary embodiment includes the control path element 2000 and the data path element 3000. The data path element 3000 includes the function processing unit 4000. The function processing unit 4000 includes the control comparison unit 4001 and the data calculation unit 4002.

In addition to the components shown in FIG. 2, the computation device 1 includes a register 104 in the data path element 3000. The computation device 1 further includes a logical AND 105 and a cue 106.

The output result $c_i$ of the preceding control path is input to the control path element 2000. The output result $d_i$ of the preceding data path, as well as validity information (hereinafter assuming that the validity information is input in the form of a digital signal having a value 0 or 1, and is referred to as a valid signal) $v_i$ indicating the validity of the output result of the preceding data path is input to the function processing unit 4000. The valid signal $v_i$ having the value 0 indicates invalid, and the valid signal $v_i$ having the value 1 indicates valid.

Further, an operation stop request $r_i$ (hereinafter assuming that the request is input in the form of a digital signal having the value 0 or 1, and is referred to as a ready signal) output from the computation device located at the subsequent stage is input to the logical AND 105. The ready signal $r_i$ is a signal indicative of whether the computation device located at the subsequent state requests to stop the operation. The ready signal $r_i$ having the value 1 indicates that the operation stop is not requested, and the ready signal $v_i$ having the value 0 indicates that the operation stop is requested.

The computation device 1 can stop the processing of the data calculation unit 4002 when the ready signal $r_i$ indicates 0. For example, during execution of arithmetic processing, the subsequent-stage computation device having a low processing speed outputs the ready signal $r_i$ having the value 0 to the preceding-stage computation device. At this time, the computation device 1 may stop the processing of the data calculation unit 4002. Then, the computation device 1 may wait until the arithmetic processing of the subsequent-stage computation device is completed and the ready signal $r_i$ indicates 1, and may resume the processing of the data calculation unit 4002.

When the processing of the data calculation unit 4002 is not completed, even if the ready signal $r_i$ indicates 0, it is not necessary for the computation device 1 to stop the processing of the data calculation unit 4002 immediately.

In this manner, the computation device 1 can control stopping and permission of the processing of the data calculation unit 4002 according to the value of the ready signal $r_i$.

The event 1000 is input to the cue 106. The cue 106 functions as holding means for sequentially holding the event 1000. The valid signal $v_i$ is input also to the cue 106. When the input valid signal $v_i$ has a value of 1 (valid), the cue 106 outputs the event located at the head to the data calculation unit 4002. The cue 106 inputs, to the logical AND 105, an empty signal (1: holding an event, 0: holding no event) representing information (event holding information) indicative of whether an event is held or not.

When one of the empty signal and the ready signal $r_i$ is 0, the logical AND 105 inputs a ready signal $r_0$ having a value 0 to the preceding-stage computation device. Specifically, the logical AND 105 operates as operation stop request generation means for generating the ready signal to be input to a preceding-stage computation device. When one of the empty signal and the ready signal $r_i$ indicates 0, the data calculation unit 4002 is in the state of being unable to execute any computations. In the other case (when both the empty signal and the ready signal $r_i$ indicate 1), the data calculation unit 4002 is in the state of being able to execute a computation. At this time, the logical AND 105 transmits, to the preceding-stage computation device, the executable/inexecutable state indicating whether or not the data calculation unit 4002 can execute a computation.

The configuration described above allows the computation device 1 to recognize the processing status of the computation device located at the subsequent stage, by using the ready signal. As a result, the preceding-stage computation device can reliably transmit the computation result to the subsequent-stage computation device, even when a computation is performed by using a computation device having a high processing speed as the preceding-stage computation device and by using a computation device having a low processing speed as the subsequent-stage computation device, for example. Accordingly, the computation can be performed normally.

Note that the components shown in FIG. 31 are configured assuming that propagation of the ready signal to the preceding stage is completed in one cycle. When a plurality of cycles is required for the components of peripheral circuits of the AND 105 and the cue 106, for example, to propagate the ready signal, a prediction mechanism for predicting that the cue 105 is empty or that the arithmetic processing of the subsequent-stage computation device is delayed may be newly provided. The ready signal can be accurately propagated by setting the value of the ready signal according to the prediction of the prediction mechanism.

For example, the prediction mechanism first sets the ready signal to 0, when the prediction mechanism predicts, based on the configuration of the own cue 106, that the cue 106 becomes empty after several clocks, or predicts that the reception of the ready signal from the subsequent stage is delayed because of the fact that several clocks are required for the arithmetic processing of the subsequent-stage computation device.

Figure 32:
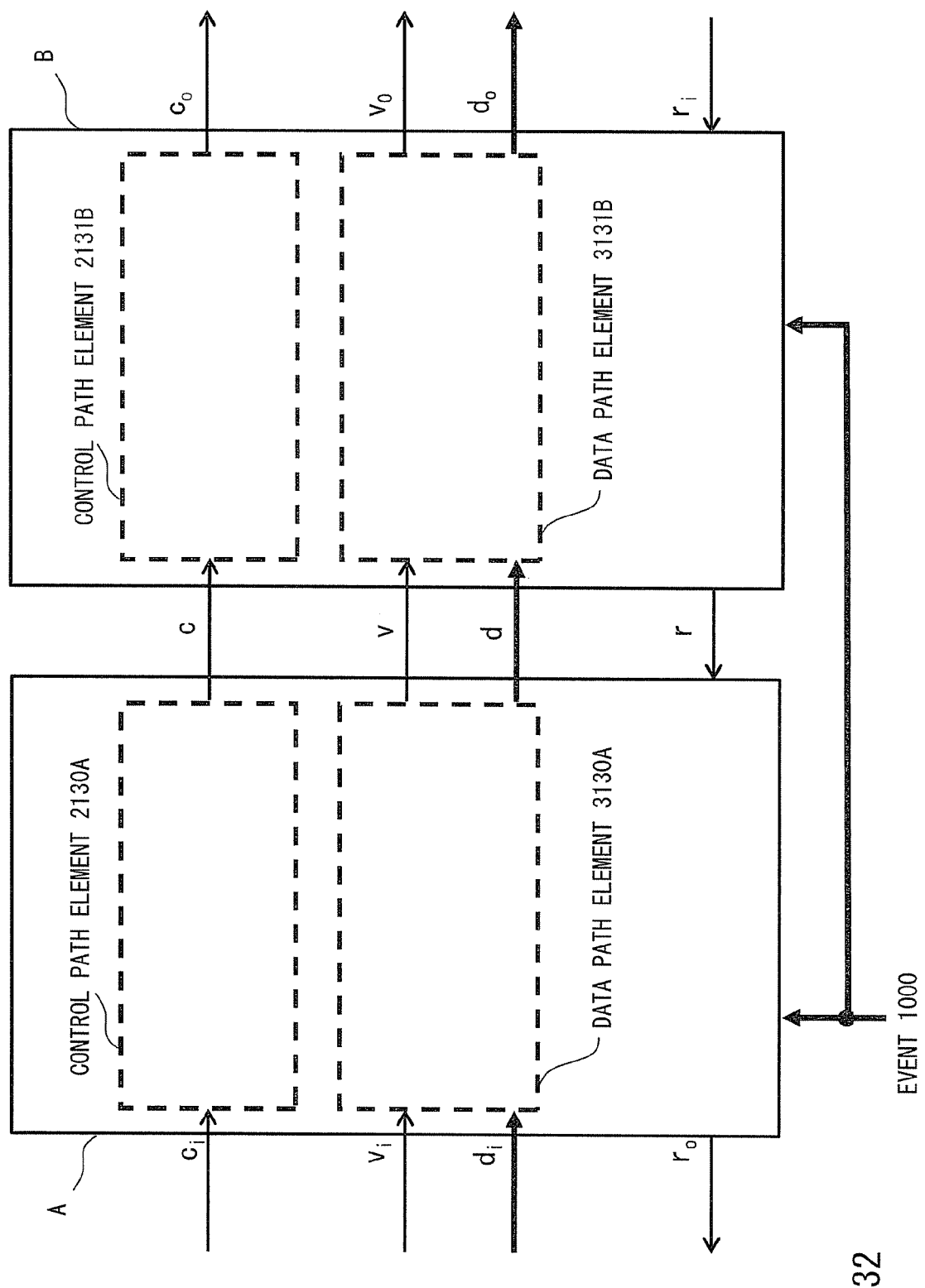
FIG. 32 is a diagram showing an example of a concatenation of regular expressions in the seventh exemplary embodiment of the present invention.

Next, a description is made of an example in which two computation devices shown in FIG. 31 are connected using the concatenation described in the second exemplary embodiment. FIG. 32 is a diagram showing that the concatenation of regular expressions is configured using two computation devices shown in FIG. 31. A first computation device A includes a control path element 2130A and a data path element 3130A. A second computation device B includes a control path element 2131B and a data path element 3131B. In accordance with the rules shown in FIGS. 2, 3, and 5, the control path elements 2130A and 2131B are connected as a concatenation and the data path elements 3130A and 3131B are connected as a concatenation.

In this case, the valid signal $v_i$ is input to the data path element 3130A, and the data path element 3130A outputs a valid signal v to the data path element 3131B according to the computation result. The data path element 3131B inputs a valid signal $v_0$ to the subsequent-stage computation device.

Similarly, the ready signal $r_i$ is input to the second computation device B, and the second computation device B inputs a ready signal r to the first computation device A.

In the configuration of the computation device shown in FIG. 32, the control path elements 2130A and 2131B are connected as a concatenation and the data path elements 3130A and 3131B are connected as a concatenation in accordance with the rules shown in FIGS. 2, 3, and 5. This configuration makes it possible to compute the regular expressions described by the concatenation. Furthermore, as with the third exemplary embodiment, detection of an event sequence matching the comparison result specified in each function, and execution of a computation specified in each function can be performed.

Figure 33:
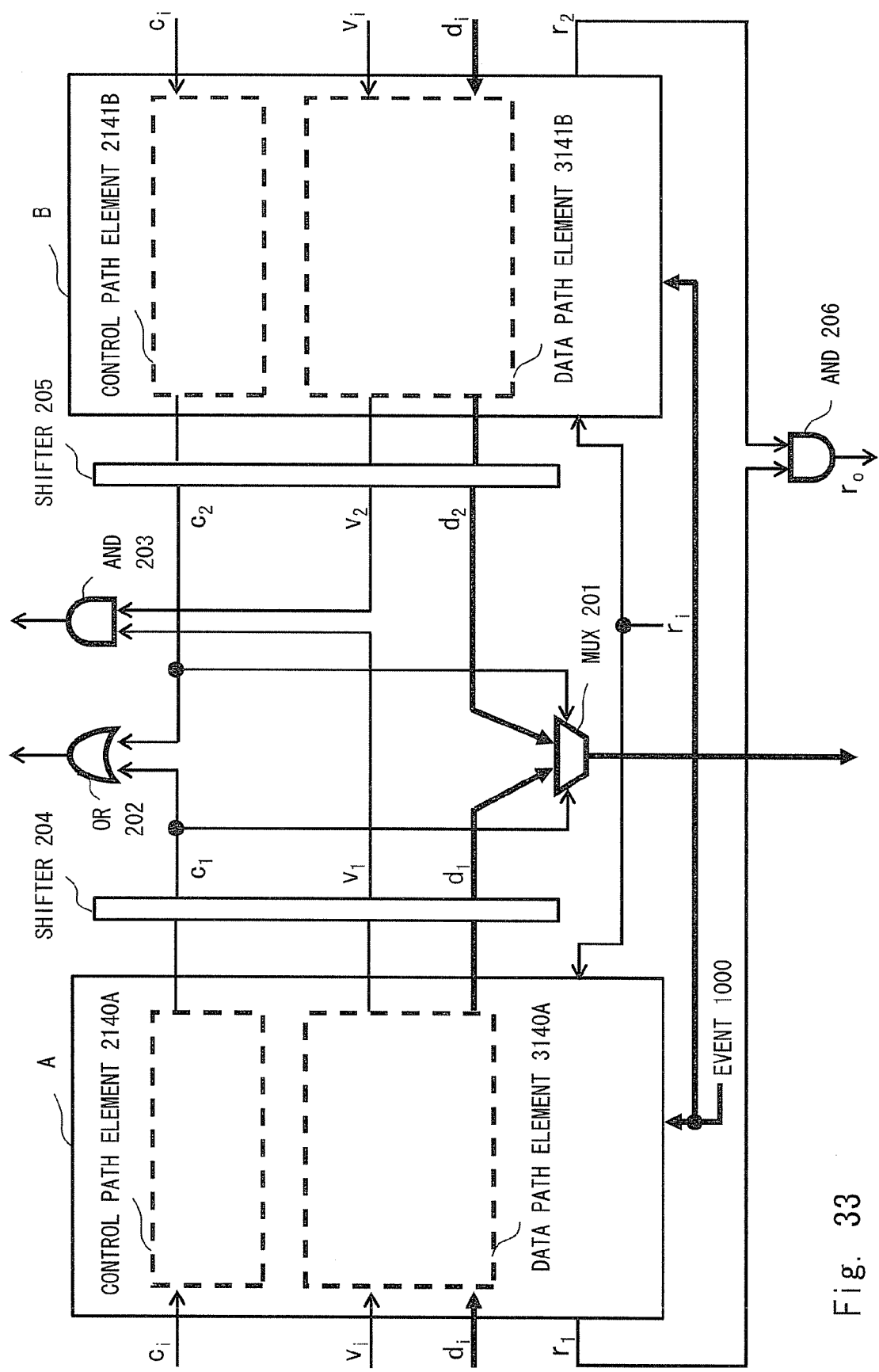
FIG. 33 is a diagram showing an example of a sum of regular expressions in the seventh exemplary embodiment of the present invention.

Next, a description is made of an example in which two computation devices shown in FIG. 31 are connected using the sum described in the second exemplary embodiment. FIG. 33 is a diagram showing that the sum of regular expressions is configured using two computation devices shown in FIG. 31.

The first computation device A includes a control path element 2140A and a data path element 3140A. The second computation device B includes a control path element 2141B and a data path element 3141B. In accordance with the rules shown in FIGS. 2, 3, and 6, the control path elements 2140A and 2141B are connected as a sum and the data path elements 3140A and 3141B are connected as a sum.

In this case, in addition to the components shown in FIG. 15, the valid signal $v_i$ and the ready signal $r_i$ are input to each of the first computation device A and the second computation device B.

The first computation device A is connected to a shifter 204. Similarly, the second computation device B is connected to a shifter 205. The shifter 204 receives the control path output result $c_1$ of the control path element 2140A, the output result $d_1$ of the data path of the data path element 3140A, and a valid signal $v_1$ of the data path element 3140A. The shifter 205 receives the control path output result $c_2$ of the control path element 2141B, the output result $d_2$ of the data path of the data path element 3141B, and a valid signal $v_2$ of the data path element 3141B.

The shifter 204 and the shifter 205 operate as delay means for providing a delay to eliminate the difference in the number of computation cycles of the first computation device A and the second computation device B. For example, when the number of computation cycles of the first computation device A is smaller by three cycles than the number of computation cycles of the second computation device B, the shifter 204 provides a delay corresponding to three cycles to each signal. Note that when the number of computation cycles of the first computation device A and the number of computation cycles of the second computation device B are the same, there is no need to provide the shifters 204 and 205.

A logical AND 203 receives the valid signal $v_1$ of the data path element 3140A, and the valid signal $v_2$ of the data path element 3141B. The logical AND 203 outputs 1 as the valid signal to the subsequent-stage computation device only when both signals (valid signal $v_1$ and valid signal $v_2$) indicate 1.

A logical AND 206 receives the ready signal $r_1$ from the first computation device A and a ready signal $r_2$ from the second computation device B. When one of the ready signals indicates 0, the logical AND 203 outputs the ready signal having the value 0 to the computation device located at the preceding stage.

In the configuration of the computation device shown in FIG. 33, the control path elements 2140A and 2141B are connected as a sum and the data path elements 3140A and 3141B are connected as a sum in accordance with the rules shown in FIGS. 2, 3, and 6. This configuration enables computation of regular expressions described using the sum. Furthermore, as with the fourth exemplary embodiment, detection of an event sequence matching the comparison result specified in each function, and execution of a computation specified in each function can be performed.

Figure 34:
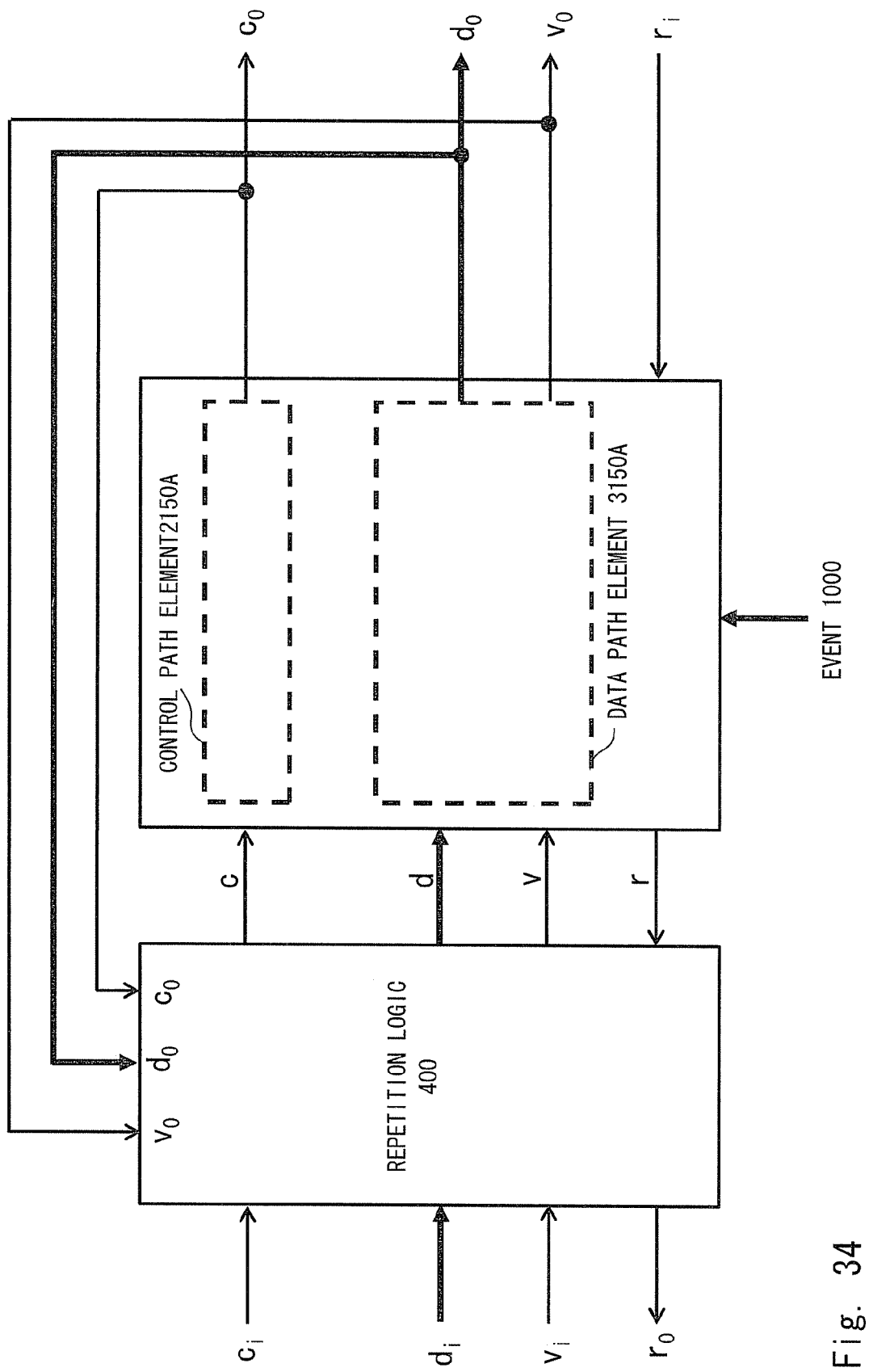
FIG. 34 is a diagram showing an example of a repetition in a regular expression in the seventh exemplary embodiment of the present invention.

Next, a description is made of an example in which the computation device shown in FIG. 31 is used to implement the repetition in the regular expressions described in the second exemplary embodiment. FIG. 34 is a diagram showing that the repetition of the regular expressions is configured using the computation device shown in FIG. 31. The computation device includes a control path element 2150A and a data path element 3150A.

As shown in FIG. 34, a repetition logic 400 is connected to the computation device. The repetition logic 400 is a processing unit including the multiplexer MUX 301 described above, and performs processing for controlling the repetition in the regular expressions.

The repetition logic 400 receives not only the output result $c_i$ of the preceding control path, the result $d_i$ of the preceding data path element, and the preceding valid signal $v_i$, but also the output result $c_O$ of the control path element 2150A, the result $d_O$ of the data path element 3150A, and the valid signal $v_O$ output from the data path element 3150A.

When the output result $c_O$ of the control path element 2150A is valid and indicates 0, the repetition logic 400 selects the outputs $c_i$, $d_i$, and $v_i$ of the computation device located at the preceding stage, and outputs the selected outputs to the control path element 2150A and the data path element 3150A.

On the other hand, when the output result $c_O$ of the control path element 2150A is valid and indicates 1, the repetition logic 400 selects the output $c_O$ of the control path element 2150A, and the outputs $d_O$ and $v_O$ of the data path element 3150A, and inputs the selected outputs to the control path element 2150A and the data path element 3150A.

In this case, when there is an input from the preceding-stage computation device during the arithmetic processing of the computation device (specifically, the data path element 3150A), the computation device cannot process the input. Accordingly, the repetition logic 400 controls the ready signal $r_O$, which is supplied to the preceding-stage computation device, to be set to 0 during the arithmetic processing by the data path element 3150A. Even when the ready signal $r_i$ having the value 0 is input from the subsequent-stage computation device, the repetition logic 400 controls the ready signal $r_O$, which is supplied to the preceding-stage computation device, to be set to 0.

Note that the repetition logic 400 may be provided within the computation device, or may be provided outside the computation device.

The configuration shown in FIG. 34 enables computation of regular expressions representing a repetition. Furthermore, as with the fifth exemplary embodiment, detection of an event sequence matching the comparison result specified in each function, and execution of a computation specified in each function can be performed.

(8) Eighth Exemplary Embodiment of the Present Invention

Next, an eighth exemplary embodiment of the present invention will be described. The above description has been made assuming that the computation device is basically hardware. However, the computation device can also be implemented by software, i.e., a program for causing a computer to execute arithmetic processing using an event including one or more pieces of input data as an input.

Specifically, the program according to this exemplary embodiment executes data processing for executing a computation, which is specified in a function using input data as an argument, to output a result, and causing the function processing unit to execute processing for outputting a comparison result of the input data as a return value, and control processing for detecting an event by use of the return value of the function.

Figure 35:
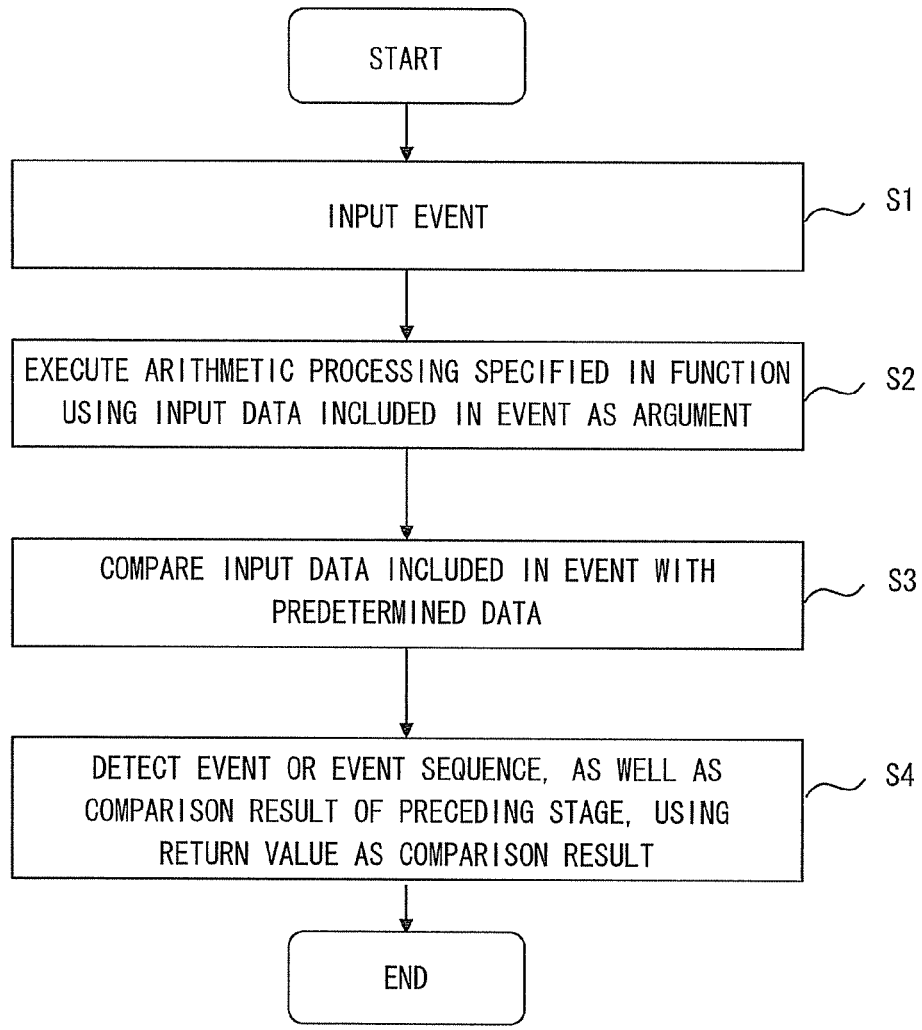
FIG. 35 is a flowchart showing an example of a device that executes a program according to an eighth exemplary embodiment of the present invention.

FIG. 35 is an example of a flowchart showing the operation of the program according to this exemplary embodiment. As shown in FIG. 35, when an event is input (step S1), arithmetic processing specified in a function is executed using the input data included in the event as an argument (step S2). Meanwhile, a comparison is made as to whether the input data included in the event is predetermined data or not (step S3). As the control processing, steps S2 and S3 are data processing executed by the function processing unit in the first to seventh exemplary embodiments. Further, it is detected whether a predetermined event or event sequence has occurred or not, by using the return value obtained in step S3 as the comparison result indicating whether the input event is an event to be detected, as well as the comparison result of the preceding stage, if necessary (step S4).

Figure 36:
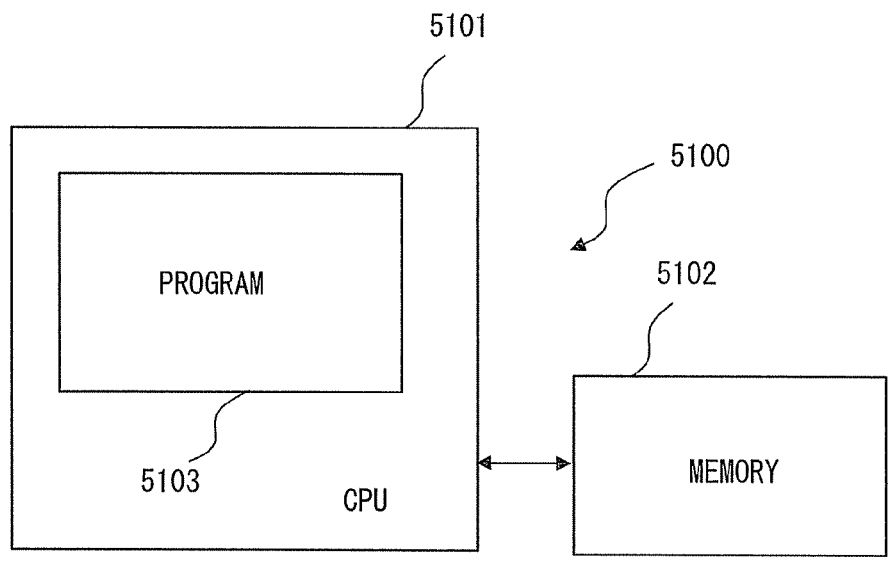
FIG. 36 is a flowchart showing an event detection operation of the program according to the eighth exemplary embodiment of the present invention.
Figure 37A:
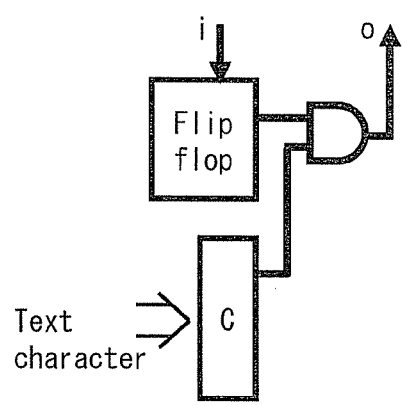
FIG. 37A is a diagram illustrated in Patent Literature 1 and shows a configuration pattern for converting a basic operator (character comparison) of a regular expression into hardware.
Figure 37B:
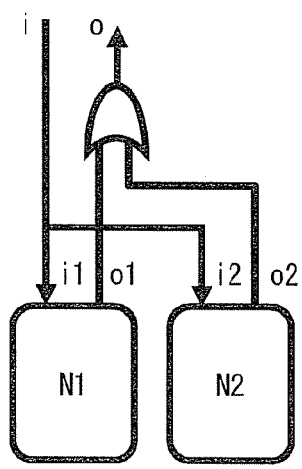
FIG. 37B is a diagram illustrated in Patent Literature 1 and shows a configuration pattern for converting a basic operator (sum) of a regular expression into hardware.
Figure 37C:
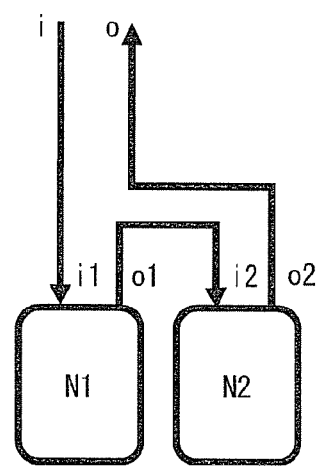
FIG. 37C is a diagram illustrated in Patent Literature 1 and shows a configuration pattern for converting a basic operator (concatenation) of a regular expression into hardware.
Figure 37D:
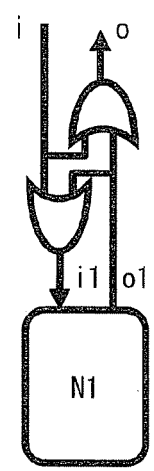
FIG. 37D is a diagram illustrated in Patent Literature 1 and shows a configuration pattern for converting a basic operator (repetition) of a regular expression into hardware.

The event detection processing and the arithmetic processing specified in each function as described above can be implemented by a computer such as a dedicated computer or a personal computer (PC). Note that the computer is not necessarily a physically single computer, but a plurality of computers may be used to execute distributed processing. FIG. 36 is a diagram showing a configuration example of a device that executes the program according to this exemplary embodiment.

As shown in FIG. 36, a computer 5100 includes a CPU 5101 (Central Processing Unit) and a memory 5102 including a ROM (Read Only Memory), a RAM 5103 (Random Access Memory), or the like. Note that an OS (Operation System) that causes the computer to operate, for example, may be included in the computer constructing this information processing device.

The CPU 5101 loads various programs 5103 stored in the memory 5102, and executes various processing according to the programs 5103. In this exemplary embodiment, processing such as the above-mentioned data processing and control processing is executed, for example. The memory 5102 stores, as needed, data necessary for the CPU 5101 to execute various processing.

The program according to this exemplary embodiment can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM, CD-R, CD-R/W, and semiconductor memories (such as mask ROM, PROM (programmable ROM), EPROM (erasable PROM), flash ROM, RAM, etc.). The program may be provided to a computer using any type of transitory computer readable media. Examples of transitory computer readable media include electric signals, optical signals, and electromagnetic waves. Transitory computer readable media can provide the program to a computer via a wired communication line, such as electric wires and optical fibers, or a wireless communication line.

As described above, the program according to this exemplary embodiment processes all arithmetic processing by software. In this manner, the arithmetic processing of the present invention can also be processed by software, without using the computation device as hardware.

Note that the present invention is not limited to the above-described exemplary embodiments, but can be modified in various manners without departing from the scope of the present invention.

This application is based upon and claims the benefit of priority from Japanese patent application No. 2011-034906, filed on Feb. 21, 2011, and Japanese patent application No. 2011-182707, filed on Aug. 24, 2011, the disclosure of which is incorporated herein in its entirety by reference.

REFERENCE SIGNS LIST 100, 201, 301, 302 MULTIPLEXER (MUX)
101, 105 LOGICAL AND CIRCUIT (AND)
102, 103, 104 REGISTER
106 CUE
202 LOGICAL OR (OR)
203, 206 LOGICAL AND (AND)
204, 205 SHIFTER
400 REPETITION LOGIC
1000, 1010, 1020, 1030 EVENT
2100, 2101, 2200, 2201, 2300,
2110, 2111, 2210, 2211, 2310,
2120, 2121, 2220, 2221, 2320,
2130, 2131, 2140, 2141, 2150, CONTROL PATH ELEMENT
3100, 3101, 3200, 3201, 3300
3110, 3111, 3210, 3211, 3310
3120, 3121, 3220, 3221, 3320,
3130, 3131, 3140, 3141, 3150, DATA PATH ELEMENT
4000 FUNCTION
4001 CONTROL COMPARISON UNIT
4002 DATA CALCULATION UNIT

What is claimed is:

1. A computation device comprising:
 a first data processing unit including a first function processing unit for executing a first computation specified in a first function using first input data included in a first event as an argument; and
 a first control processing unit for detecting the first event by use of a first return value of the first function,
 wherein the first function processing unit comprises:
  a first data calculation unit for executing the first computation and outputting a first result; and
  a first control comparison unit for outputting, to the first control processing unit, a result of comparison between the first input data and first data for specifying the first event, as the first return value.

2. The computation device according to claim 1, comprising:
 a second data processing unit including a second function processing unit for executing a computation specified in a second function using second input data included in a second event as an argument; and
 a second control processing unit for detecting a second event by use of a second return value of the second function, wherein
 the second function processing unit comprises:
  a second data calculation unit for executing the second computation and outputting a second result; and
  a second control comparison unit for outputting, to the second control processing unit, a result of comparison between the second input data and second data for specifying the second event, as the second return value, and
 an event sequence including the first event and the second event is detected based on the first return value and the second return value.

3. The computation device according to claim 2, wherein the first function and the second function constitute a function sequence represented by a regular expression, and the first data calculation unit executes the first computation using at least one of the first input data and the first result as an argument, and outputs the first result, the second data calculation unit executes the second computation using at least one of the second input data, the first result, and the second result as an argument, and outputs the second result, and a third result is output using at least one of the first result and the second result based on the regular expression.

4. The computation device according to claim 2, wherein the second function processing unit determines whether or not to perform the second computation according to a value of a second operation stop request received.

5. The computation device according to claim 4, comprising:
a second holding unit for holding the second event, outputting second event holding information indicative of whether or not the number of held second events is 0, and supplying the second events to the second function processing unit in order of inputting the second events; and
a second operation stop request generation unit for generating a fourth operation stop request for controlling execution of a computation of a preceding-stage computation device based on the second event holding information and the value of the second operation stop request.

6. The computation device according to claim 5, wherein the second holding unit determines whether or not to supply the second event to the second function processing unit, based on second validity information indicative of whether a result of the execution of the computation of the preceding-stage computation device is valid or not.

7. The computation device according to claim 2, wherein
the first function and the second function constitute a function sequence represented by a regular expression,
the regular expression includes the functions and an operator, and
the operator includes at least one of a concatenation to describe execution of a computation of a function subsequent to a certain function, a sum to describe which one of the two functions is to be selected, and a repetition to describe one or more computations of the functions.

8. The computation device according to claim 7, wherein
when the regular expression includes the first and second functions and a concatenation to describe execution of a computation of the second function after the first function,
the second data processing unit outputs a result of the arithmetic processing based on a result of the arithmetic processing of the first data processing unit, and
the second control processing unit outputs a detection result based on a result of the second control processing unit.

9. The computation device according to claim 7, wherein when the regular expression includes the first and second functions and a concatenation to describe execution of a computation of the second function after the first function, the first and second data processing unit are connected in series and the first and second control processing unit are connected in series.

10. The computation device according to claim 7, wherein when the regular expression includes the first and second functions and a sum to describe which one of the first and second functions is to be selected, the computation device comprises:
determination unit for determining that an event sequence is detected, when at least one of the first and second control processing unit detects an event; and
a first selection unit for selecting and outputting one of computation results of the first and second data processing unit according to output results of the first and second control processing unit.

11. The computation device according to claim 7, wherein when the regular expression includes the first and second functions and a sum to describe which one of computations of the first and second functions is to be selected,
the computation device comprises a logic circuit that computes a logical OR, and a first multiplexer, and
outputs of the first and second control processing unit are input to the logic circuit, and the logical OR is output as a result of detection of an event sequence,
the first and second data processing unit input computation results to an input of the first multiplexer, and
the first multiplexer outputs one of comparison results of the first and second data processing unit according to output results of the first and second control processing unit.

12. The computation device according to claim 11, wherein
a logical AND between information indicative of whether a result of the first computation is a valid value or not and information indicative of whether a result of the second computation is a valid value or not is supplied as information indicating validity of a computation result to a subsequent-stage computation device, and
a logical AND between a state indicative of whether the first data calculation unit is executable or not and a state indicative of whether the second data calculation unit is executable or not is output as an operation stop request to be supplied to a subsequent-stage computation device.

13. The computation device according to claim 11, comprising delay unit for delaying an output of one of the first and second data processing unit based on the number of cycles required for computations of the first and second data processing unit.

14. The computation device according to claim 1, wherein the first function processing unit determines whether or not to perform the first computation according to a value of a first operation stop request received.

15. The computation device according to claim 14, comprising:
a first holding unit for holding the first event, outputting first event holding information indicative of whether or not the number of held first events is 0, and supplying the first events to the first function processing unit in order of inputting the first events; and
a first operation stop request generation unit for generating a third operation stop request for controlling execution of a computation of a preceding-stage computation device based on the first event holding information and the value of the first operation stop request.

16. The computation device according to claim 15, wherein the first holding unit determines whether or not to supply the first event to the first function processing unit, based on first validity information indicative of whether a result of the execution of the computation of the preceding-stage computation device is valid or not.

17. The computation device according to claim 1, wherein the computation device receives, as real-time information, an event sequence including two or more of the events.

18. The computation device according to claim 1, wherein the data calculation unit stores, compares, or computes the input data, and outputs the input data.

19. A computation device comprising:
a first computation device that executes arithmetic processing on a first function; and
a second computation device that executes arithmetic processing on a second function, wherein the first computation device comprises:
- a first data processing unit including a first function processing unit for executing a first computation specified in a first function using first input data included in a first event as an argument; and
- a first control processing unit for detecting the first event by use of a first return value of the first function, and the first function processing unit comprises:
- a first data calculation unit for executing the first computation and outputting a first result; and
- a first control comparison unit for outputting, to the first control processing unit, a result of comparison between the first input data and first data for specifying the first event, as the first return value.

20. The computation device according to claim 19, wherein the second computation device comprises:
- a second data processing unit including a second function processing unit for executing a computation specified in a second function using second input data included in a second event as an argument; and
- a second control processing unit for detecting a second event by use of a second return value of the second function, the second function processing unit comprises:
- a second data calculation unit for executing the second computation and outputting a second result; and
- a second control comparison unit for outputting, to the second control processing unit, a result of comparison between the second input data and second data for specifying the second event, as the second return value, and
- an event sequence including the first event and second event is detected based on the first return value and the second return value.

21. The computation device according to claim 19, comprising:
- a second determination unit for determining whether or not to input an output of a preceding-stage control processing unit to the first control processing unit according to an output result of the first control processing unit; and
- a third determination unit for selecting one of output results of the first data processing unit and preceding-stage data processing unit according to the output result of the first control processing unit, and inputting the selected output result to the first data processing unit.

22. The computation device according to claim 19, comprising a repetition logic for repeating an input to each of the first control processing unit and the first data processing unit according to an output result of the first control processing unit, wherein the repetition logic outputs, to a preceding-stage computation device, a fixed value for requesting to stop arithmetic processing during computation of the first data processing unit.

23. The computation device according to claim 19, comprising second and third multiplexers, wherein
- the second multiplexer determines whether or not to input an output of preceding-stage control processing unit to the first control processing unit according to an output result of the first control processing unit, and
- the third multiplexer selects one of output results of the first data processing unit and preceding-stage data processing unit according to an output result of the first control processing unit, and inputs the selected output result to the first data processing unit.

24. A computation execution method, implemented by a CPU, comprising:
- executing a first computation to output a first result, and outputting, as a first return value, a result of comparison between first input data included in a first event and first data for specifying the first event, thereby executing the first computation specified in a first function using the first input data as an argument; and
- detecting the first event by use of the first return value of the first function.

25. The computation execution method according to claim 24, wherein a computation of a regular expression including the first function and an operator for describing a repetition to describe one or more computations of the first function, by use of an event sequence including the event as an input.

26. The computation execution method according to claim 24, wherein the event sequence is real-time information.

27. The computation execution method according to claim 24, wherein the computation specified in the first function using the input data as an argument is processing of storing, comparing, or computing the input data.

28. A computation execution method, implemented by a CPU, comprising:
- executing arithmetic processing for a first function by use of an event sequence including a first event including one or more pieces of first input data and a second event including one or more pieces of second input data;
- executing arithmetic processing for a second function by use of the event sequence as an input, wherein the arithmetic processing for the first function includes:
- executing a first computation specified in the first function to output a first result, and outputting, as a first return value, a result of comparison between the first input data and first data for specifying the first event, thereby executing the first computation by use of the first input data as an argument, and
- detecting the first event by use of the first return value of the first function.

29. The computation execution method according to claim 28, wherein the arithmetic processing for the second function includes:
- executing a second computation specified in the second function to output a second result, and outputting, as a second return value, a result of comparison between the second input data and second data for specifying the second event, thereby executing the second computation using the second input data as an argument;
- detecting the second event by use of the second return value of the second function; and
- detecting the event sequence based on the first return value and the second return value.

30. A non-transitory computer readable medium storing a program for causing a computer to execute:
- a first data processing for executing a first computation to output a first result, and outputting, as a first return value, a result of comparison between first input data and first data, thereby executing the first computation specified in a first function using the first input data as an argument; and
- a first control processing for detecting a first event including one or more pieces of the first input data, by use of the first return value of the first function.

31. The non-transitory computer readable medium storing a program according to claim 30, wherein a computation of a regular expression including the first function and an operator for describing a repetition to describe one or more computations of the first function, by use of an event sequence including the event as an input.

32. The non-transitory computer readable medium storing the program according to claim 30, wherein the event sequence is real-time information.

33. The non-transitory computer readable medium storing the program according to claim 30, wherein the computation specified in the first function using the input data as an argument is processing of storing, comparing, or computing the input data.

34. A non-transitory computer readable medium storing a program for causing a computer to execute a predetermined operation including:
   a first arithmetic processing for executing arithmetic processing for a first function by using, as an input, an event sequence including a first event including one or more pieces of first input data and a second event including one or more pieces of second input data; and
   a second arithmetic processing for executing arithmetic processing for a second function by using the event sequence as an input,
   wherein the first arithmetic processing includes:
      a first data processing for executing a first computation specified in the first function to output a first result, and outputting, as a first return value, a result of comparison between the first input data and first data for specifying the first event, thereby executing the first computation using the first input data as an argument; and
      a first control processing for detecting the first event by use of the first return value of the first function.

35. The non-transitory computer readable medium storing the program according to claim 34, wherein the second arithmetic processing includes:
   a second data processing for executing a second computation specified in the second function to output a second result, and outputting, as a second return value, a result of comparison between the second input data and second data for specifying the second event, thereby executing the second computation using the second input data as an argument; and
   a second control processing for detecting the second event by use of the second return value of the second function, and
   the event sequence is detected based on the first return value and the second return value.

* * * * *